US012709414B2

(12) United States Patent
Stricklan et al.

(10) Patent No.: US 12,709,414 B2
(45) Date of Patent: Aug. 18, 2026

(54) METHODS AND SYSTEM FOR SPACE TRAFFIC COORDINATION AND DATA SHARING FOR COLLISION AVOIDANCE

(71) Applicant: Slingshot Aerospace, Inc., Austin, TX (US)

(72) Inventors: Melanie Dawn Stricklan, Los Angeles, CA (US); Holly Marie Highfill, Chicago, IL (US); Belinda Grace Marchand, Austin, TX (US); Kishen Raghunath, Falls Church, VA (US); Corey Christopher O'Neal, Knoxville, TN (US)

(73) Assignee: Slingshot Aerospace, Inc., Austin, TX (US)

( * ) Notice: Subject to any disclaimer, the term of this patent is extended or adjusted under 35 U.S.C. 154(b) by 56 days.

(21) Appl. No.: 18/486,891

(22) Filed: Oct. 13, 2023

(65) Prior Publication Data

US 2024/0150045 A1 May 9, 2024

Related U.S. Application Data

(60) Provisional application No. 63/382,941, filed on Nov. 9, 2022.

(51) Int. Cl.
*B64G 3/00* (2006.01)
*B64G 1/24* (2006.01)

(52) U.S. Cl.
CPC ............... *B64G 3/00* (2013.01); *B64G 1/242* (2013.01)

(58) Field of Classification Search
CPC .......... B64G 1/247; B64G 3/00; B64G 1/242; G06T 7/70; G06T 2200/24;
(Continued)

(56) References Cited

U.S. PATENT DOCUMENTS 5,983,161 A * 11/1999 Lemelson ............... G01S 19/11 340/436
6,459,406 B1 10/2002 Tseng et al.
(Continued)

FOREIGN PATENT DOCUMENTS

CA 2874532 A1 * 11/2013 ............... B64G 1/66
CN 111310312 A * 6/2020
(Continued)

OTHER PUBLICATIONS

"Method for Collision Avoidance in Spacecraft Rendezvous Problems with Space Objects in a Phasing Orbit." Computer modeling in engineering & sciences (2021): n. pag. Web. (Year: 2021).*
(Continued)

*Primary Examiner* — Erin D Bishop
*Assistant Examiner* — Keith A von Volkenburg
(74) *Attorney, Agent, or Firm* — Venable LLP

(57) ABSTRACT

Systems and methods of collision avoidance between space objects may include: (a) receiving state data corresponding to a plurality of space objects; (b) identifying, based at least in part on the state data, a potential future collision between a first space object of the plurality of space objects and a second space object of the plurality of space objects; (c) transmitting a notification of the potential future collision to a first operator of the first space object and a second operator of the second space object; (d) establishing a communication pathway between the first operator and the second operator; and (e) transmitting, via the communication pathway, a message, automatically generated by the first operator, to the second operator.

21 Claims, 12 Drawing Sheets

(58) Field of Classification Search

CPC G06T 2207/10032; G06T 2207/20084; G06V 10/82; G06V 20/50; G08G 5/26; G08G 5/80

USPC .......................................................... 701/13

See application file for complete search history.

(56) References Cited

U.S. PATENT DOCUMENTS

| | | | | |
|---|---|---|---|---|
| 6,813,596 | B2 | 11/2004 | Ellis et al. | |
| 6,895,314 | B2 | 5/2005 | Ailor et al. | |
| 7,203,596 | B2 | 4/2007 | Ledingham et al. | |
| RE40,800 | E | 6/2009 | Smith | |
| 7,557,753 | B2 | 7/2009 | Ailor, III | |
| 9,941,967 | B2 | 4/2018 | Welle et al. | |
| 10,116,379 | B2 | 10/2018 | Garcia et al. | |
| 10,524,159 | B2 | 12/2019 | Xenakis et al. | |
| 10,650,687 | B2 | 5/2020 | Dolan et al. | |
| 10,659,145 | B2 | 5/2020 | Garcia et al. | |
| 10,901,093 | B2 | 1/2021 | Garcia et al. | |
| 10,903,899 | B2 | 1/2021 | Baudoin et al. | |
| 10,996,340 | B1 | 5/2021 | Utter et al. | |
| 11,064,049 | B2 | 7/2021 | Pritchett | |
| 11,091,280 | B1 | 8/2021 | Conn et al. | |
| 11,158,943 | B2 | 10/2021 | Bull et al. | |
| 11,212,187 | B1 | 12/2021 | Welle | |
| 11,267,590 | B2 | 3/2022 | Ashrafi | |
| 11,317,323 | B2 | 4/2022 | Tatum | |
| 11,649,076 | B2 * | 5/2023 | Tack | B64G 1/244 701/531 |
| 11,668,834 | B2 | 6/2023 | Reid et al. | |
| 11,780,612 | B1 * | 10/2023 | Kopardekar | B64G 1/14 701/13 |
| 12,288,011 | B2 | 4/2025 | Marchand et al. | |
| 2004/0024527 | A1 | 2/2004 | Patera | |
| 2009/0287364 | A1 | 11/2009 | Burnett et al. | |
| 2011/0074767 | A1 | 3/2011 | Bézy et al. | |
| 2013/0124079 | A1 | 5/2013 | Olivier et al. | |
| 2013/0292517 | A1 | 11/2013 | Briskman | |
| 2015/0134295 | A1 | 5/2015 | Kim et al. | |
| 2018/0075099 | A1 | 3/2018 | Park et al. | |
| 2019/0007127 | A1 | 1/2019 | Ward | |
| 2021/0082297 | A1 | 3/2021 | Jacobus et al. | |
| 2021/0261276 | A1 | 8/2021 | Tack et al. | |
| 2021/0342669 | A1 | 11/2021 | Godwin, IV et al. | |
| 2022/0058922 | A1 | 2/2022 | Bai et al. | |
| 2022/0153262 | A1 * | 5/2022 | Gallo | G01S 7/417 |
| 2022/0159544 | A1 | 5/2022 | Gupta | |
| 2022/0343138 | A1 * | 10/2022 | Tang | G06N 3/0464 |
| 2022/0371755 | A1 * | 11/2022 | Mukae | B64G 1/52 |
| 2023/0188203 | A1 | 6/2023 | Hesar et al. | |
| 2023/0222671 | A1 * | 7/2023 | Kim | G06V 10/22 382/103 |
| 2024/0135055 | A1 | 4/2024 | Marchand et al. | |
| 2025/0348635 | A1 | 11/2025 | Marchand et al. | |

FOREIGN PATENT DOCUMENTS

| | | | | |
|---|---|---|---|---|
| WO | WO-2020107022 A1 | 5/2020 | | |
| WO | WO-2020107022 A4 | 7/2020 | | |
| WO | WO-2021230166 A1 | 11/2021 | | |
| WO | WO-2021262867 A1 * | 12/2021 | | B64G 1/242 |
| WO | WO-2022046350 A2 * | 3/2022 | | B64G 3/00 |
| WO | WO-2022137341 A1 | 6/2022 | | |
| WO | WO-2023141303 A2 | 7/2023 | | |
| WO | WO-2024102863 A1 | 5/2024 | | |

OTHER PUBLICATIONS

U.S. Appl. No. 18/157,720 Office Action dated Apr. 30, 2024.

Co-pending U.S. Appl. No. 19/096,375, inventors Marchand; Belinda Grace et al., filed Mar. 31, 2025.

PCT/US2023/011287 International Preliminary Report on Patentability dated Aug. 2, 2024.

PCT/US2023/079160 International Preliminary Report on Patentability dated May 22, 2025.

U.S. Appl. No. 18/157,720 Notice of Allowance dated Jan. 16, 2025.

U.S. Appl. No. 18/157,720 Office Action dated Aug. 26, 2024.

Co-pending U.S. Application No. 202318157720, inventors Stricklan; Belinda Grace Marchand et al., filed on Jan. 20, 2023.

NASA Ames Research Center, Small Spacecraft Systems Virtual Institute, Small Spacecraft Technology State of the Art, Technical Publication, 327 pages (Oct. 2020).

PCT/US2023/011287 International Search Report and Written Opinion dated Aug. 1, 2023.

PCT/US2023/079160 International Search Report and Written Opinion dated Jan. 19, 2024.

FriendlyARM. NanoPi NEO Core2. 5 pages. Accessed online Apr. 2, 2024. Available at URL http://nanopi.io/nanopi-neo-core2.html.

GOMspace. NanoPower P31u. Electrical Power Supply system for small nanosatellites. 4 pages. Accessed online Apr. 2, 2024 at URL https://gomspace.com/shop/subsystems/power/nanopower-p31u.aspx.

Infinity Avionics. Volkh Processing Platform. 3 pages. Accessed online Apr. 2, 2024 at URL https://infinityavionics.com/products/volkh/.

Kongsberg Satellite Services. KSAT Designing Ground Network for Lunar Relay Satellites. Jan. 28, 2022. 3 pages. Accessed Apr. 2, 2024. Available online at URL https://www.ksat.no/news/news-archive/2022/ksat-designing-ground-network-lunar-relay/.

NASA Ames Research Center. State-of-the-Art Small Spacecraft Technology. Small Spacecraft Systems Virtual Institute. NASA/TP-20210021263. 428 pages. (Oct. 2021).

NearSpace Launch. Eyestar Radio. 4 pages. Archived on Jun. 3, 2023 from URL https://nearspacelaunch.com/collections/eyestar-radiosolutions Accessed on Apr. 2, 2024 (Internet Archive WayBack Machine ) at URL https://web.archive.org/web/20230603222357/https://nearspacelaunch.com/collections/eyestar-radiosolutions.

NearSpace Launch. EyeStar-S4 Iridium Enabled Sat-to-Sat Radio. 8 pages. Accessed online Apr. 2, 2024 at URL https://nearspacelaunch.com/eye-star/.

Raspberry Pi Ltd. Raspberry Pi Pico. Data Sheet. Nov. 2023. 6 pages. Accessed online Apr. 2, 2024. Available at URL https://datasheets.raspberrypi.com/pico/pico-product-brief.pdf.

Skinner, et al. Mitigating CubeSat confusion: Results of in-flight technical demonstrations of candidate tracking and identification technologies. Journal of Space Safety Engineering. 9(3):403-409. (Sep. 2022) https://doi.org/10.1016/j.jsse.2022.05.008.

Swift Navigation, Inc. Piksi Multi GNSS Module. 2 pages Archived on Nov. 28, 2022 from URL https://www.swiftnav.com/piksi-multi Accessed on Apr. 2, 2024 (Internet Archive WayBack Machine) at URL https://web.archive.org/web/20221128045817/https://www.swiftnav.com/piksi-multi.

VoCore Studio. VoCore2 the Coin-sized Linux Computer. vocore.io. 14 pages. Accessed online Apr. 2, 2024. Available at URL https://vocore.io/v2.html.

Werner, D. SpaceLink adds smaller satellites to data-relay constellation. SpaceNews. Feb. 24, 2022. 3 pages. Access online at URL https://spacenews.com/spacelink-adds-smaller-satellites-to-roadmap/.

Anonymous. gRPC vs. WebSocket: Key differences and which to use. Ably. Published Oct. 12, 2022. Last updated May 10, 2023. 5 Pages. Available at URL: https://ably.com/topic/grpc-vs-websocket.

Business Wire, Inc. Slingshot Aerospace Announces World's First Collision Avoidance Collaboration & Communications Platform for Space; OneWeb, Spire Global Inc. & Orbit Fab to Pilot Technology. Published online Aug. 12, 2021. Wayback Machine archived Aug. 12, 2021. Retrieved online Dec. 17, 2025. 2 pages. https://www.businesswire.com/news/home/20210812005019/en/Slingshot-Aerospace-Announces-Worlds-First-Collision-Avoidance-Collaboration-Communications-Platform-for-Space-OneWeb-Spire-Global-Inc.-Orbit-Fab-to-Pilot-Technology.

Chow, Denise. This collision avoidance tool could cut the risk of in-orbit crashes. NBC News. Published online Aug. 12, 2021. Wayback Machine archived Aug. 12, 2021. Retrieved online Dec. 18, 2025. 2 pages. https://www.nbcnews.com/science/space/collision-avoidance-tool-cut-risk-orbit-crashes-rcna1655.

(56) References Cited

OTHER PUBLICATIONS

Dreimanis, Gints. Streaming APIs and Protocols: SSE, WebSocket, MQTT, AMQP, gRPC. Aklivity.io. Published online Feb. 28, 2023. 10 Pages. Available at URL: https://www.aklivity.io/post/streaming-apis-and-protocols-sse-websocket-mqtt-amqp-grpc.

Elejalde-Ruiz, Alexia. Stellatus Solutions, a Startup Born at UChicago and Nurtured by Polsky, Acquired by Slingshot Aerospace to Help Prevent Satellite Collisions in Space. Published online Aug. 13, 2021. Wayback Machine archived Aug. 13, 2021. Retrieved online Dec. 17, 2025. 3 pages. https://polsky.uchicago.edu/2021/08/13/stellatus-a-startup-born-at-uchicago-and-nurtured-by-polsky-acquired-by-slingshot-aerospace-to-help-prevent-satellite-collisions-in-space/.

EP23743786.8 Extended European Search Report dated Oct. 2, 2025.

Gillespie, Becky Beaupre. The Making of an Entrepreneur. A Law School course helped create the world's first centralized collision avoidance platform for space. It also helped shift one student's career path. University of Chicago Law School. Published online Jan. 3, 2022. Wayback Machine archived Jan. 3, 2022. Retrieved online Dec. 18, 2025. 4 pages. https://www.law.uchicago.edu/news/making-entrepreneur.

Slingshot Aerospace, Inc. Slingshot Aerospace Announces World's First Collision Avoidance Collaboration & Communications Platform for Space; OneWeb, Spire Global Inc. & Orbit Fab to Pilot Technology. Published online Aug. 12, 2021. Wayback Machine archived Feb. 22, 2024. Retrieved online Dec. 18, 2025. 2 pages. https://www.slingshot.space/news/beacon-first-collision-avoidance-collaboration-platform.

Slingshot Aerospace, Inc. @sling_shot_aero. We're excited to announce the launch of Slingshot Beacon, the world's first collision avoidance collaboration & communications platform for space! Twitter. Published online Aug. 12, 2021. Retrieved online Dec. 18, 2025. 1 page. https://x.com/sling_shot_aero/status/1425809037069852675.

The University of Chicago. 31 Teams Selected to Advance to Phase II for the 2021 Edward L. Kaplan, '71, New Venture Challenge. Polsky Center for Entrepreneurship and Innovation. Published online Feb. 23, 2021. Wayback Machine archived Feb. 27, 2021. Retrieved online Dec. 18, 2025. 3 pages. https://polsky.uchicago.edu/2021/02/23/31-teams-selected-to-advance-to-phase-ii-for-the-2021-edward-l-kaplan-71-new-venture-challenge/.

The University of Chicago. Polsky Announces 10 Teams in the Winter 2021 I-Corps Cohort. Polsky Center for Entrepreneurship and Innovation. Published online Mar. 12, 2021. Wayback Machine archived Mar. 12, 2021. Retrieved online Dec. 17, 2025. 2 pages. https://polsky.uchicago.edu/2021/03/12/polsky-announces-10-teams-in-the-winter-2021-i-corps-cohort/.

Zehe, Daniel et al. Tutorial on a modeling and simulation cloud service. 2015 Winter Simulation Conference (WSC). Huntington Beach, CA USA. 2015. pp. 103-114. doi: 10.1109/WSC.2015.7408156.

* cited by examiner

METHODS AND SYSTEM FOR SPACE TRAFFIC COORDINATION AND DATA SHARING FOR COLLISION AVOIDANCE

CROSS-REFERENCE

This application claims the benefit of U.S. Provisional Application No. 63/382,941, filed Nov. 9, 2022, which is incorporated herein by reference in its entirety.

BACKGROUND

Space-based systems are used for national defense purposes as well as for facilitating many aspects of modern life. Every year, a growing number of satellites are launched into orbit, joining previously-launched satellites, space junk, debris, asteroids, meteors, meteorites, meteoroids, rockets, or other physical objects that are either in or near Earth's orbit. With each year's addition of newly-launched satellites, the space environment becomes increasingly congested and contested. This trend challenges the ability to maintain space situational awareness through an up-to-date space object catalog, and to maintain space control through detection and mitigation of potential on-orbit threats.

Potential future collisions (also known as "conjunctions") between satellites are predicted and warned of by various government entities, such as the 18th Space Defense Squadron (18 SDS) or the 19th Space Defense Squadron (19 SDS), across the space community, using Conjunction Data Messages (CDMs). CDMs are generally sent to satellite operators via email to alert them to conjunctions with other satellites. Operators will typically sift through the CDMs they receive to determine which, if any, merit closer inspection and which are considered actionable.

As a result of satellite operators typically relying on text files in CDM emails, determining which CDMs, out of the often-large number (may easily reach thousands) of CDMs received daily, are meaningful can be a cumbersome and inefficient task. Once operators of a satellite identify a meaningful CDM, the operators may decide to take action to avoid a collision. It is especially important for conjunctions between two active satellites that the operators of the satellites coordinate their actions with each other.

SUMMARY

In one aspect, a computer-implemented method of collision avoidance between human-made space objects comprises: (a) receiving, at one or more processors, state data corresponding to a plurality of space objects; (b) identifying, by the one or more processors, based at least in part on the state data, a potential future collision between a first space object of the plurality of space objects and a second space object of the plurality of space objects; (c) transmitting, by the one or more processors, (i) a first notification of the potential future collision to a first operator of the first space object, and (ii) a second notification of the potential future collision to the second operator of the second space object; (d) establishing, by the one or more processors, a communication pathway between the first operator and the second operator; and (e) transmitting, by the one or more processors via the communication pathway, a message from the first operator to the second operator. In some embodiments, the computer-implemented method further comprises: tracking, via the one or more processors, the plurality of space objects via one or more computer vision techniques. In some embodiments, the computer-implemented method further comprises: performing one or more autonomous coordination operations. In some embodiments, the computer-implemented method further comprises: generating, by the one or more processors, one or more maneuvers for one or both of the first space object or the second space object that avoids the potential future collision. In some embodiments, the computer-implemented method further comprises: transmitting, by the one or more processors, the one or more maneuvers to one or both of the first operator or the second operator. In some embodiments, the one or more maneuvers avoid or minimize risk of additional potential future collisions between one or both of (i) the first space object and a third space object or (ii) the second space object and a fourth space object. In some embodiments, the computer-implemented method further comprises: obtaining, at the one or more processors, a request from one or both of the first operator or the second operator to generate the one or more maneuvers. In some embodiments, the computer-implemented method further comprises: obtaining, at the one or more processors, a selected maneuver of the one or more maneuvers from the first operator; and transmitting, by the one or more processors, the selected maneuver to the second operator. In some embodiments, both the first space object and the second space object are human-made space objects. In some embodiments, both the first space object and the second space object are operable. In some embodiments, one or both of the first space object and the second space object have controllable trajectories. In some embodiments, one or both of the first space object or the second space object is manned. In some embodiments, the first space object and the second space object are each one of: a satellite, a rocket, a high-altitude balloon, a space shuttle, a lander, a rover, an orbiter, a space station, a payload, an aircraft, or a telescope. In some embodiments, the plurality of space objects comprise human-made space objects and non-human-made space objects. In some embodiments, (i) the human-made space objects comprise one or more of: a satellite, a rocket, a high-altitude balloon, a space shuttle, a lander, a rover, an orbiter, a space station, a payload, an aircraft, or a telescope; and (ii) the non-human-made space objects comprise one or more of: asteroids, comets, meteors, meteorites, Oort cloud objects, moons, planets, dwarf planets, or stars. In some embodiments, the state data corresponds to one or more of: previous location data for one or more of the plurality of space objects, current location data for one or more of the plurality of space objects, or predicted future location data for one or more of the plurality of space objects. In some embodiments, the state data comprises first predicted future location data for the first space object and second predicted future location data for the second space object. In some embodiments, the first predicted future location data and the second predicted future location data each comprise one or both of snapshot data or timeseries data. In some embodiments, distance data between the first predicted future location data and the second predicted future location data satisfies a threshold. In some embodiments, the distance data comprises a physical distance and an uncertainty. In some embodiments, the uncertainty comprises one or both of a physical distance or a probability. In some embodiments, the potential future collision between the first space object and the second space object of the plurality of space objects is identified based at least in part on the distance data. In some embodiments, the potential future collision is determined via a machine learning model. In some embodiments, the machine learning model comprises a neural network. In some embodiments, the state data comprises one or more of: flight path data, GPS data, acceleration data, rotation data, velocity data, position data, ephemeris data, tracking sensor data, orbital data, or satellite telemetry data. In some embodiments, the first notification is the same as the second notification. In some embodiments, the first notification is different than the second notification. In some embodiments, one or both of the first notification or the second notification comprise one or more of: a predicted miss distance, a probability of collision, or a time of collision. In some embodiments, one or both of the first notification or the second notification comprise one or more: position information of the first space object, ephemeris data of the first space object, planned flight paths of the first space object, satellite parameters of the first space object, flight control data of the first space object, autonomous information of the first space object, satellite sensor data of the first space object, or satellite equipment data of the first space object. In some embodiments, one or both of the first notification or the second notification comprise one or more: position information of the second space object, ephemeris data of the second space object, planned flight paths of the second space object, satellite parameters of the second space object, flight control data of the second space object, autonomous information of the second space object, satellite sensor data of the second space object, or satellite equipment data of the second space object. In some embodiments, one or both of the first notification or the second notification comprise a conjunction data message generated by a government entity. In some embodiments, one or both of the first notification or the second notification are one or more of: visual, haptic, or auditory. In some embodiments, one or both of the first notification or the second notification are transmitted via one or more of: email, text, phone call, or instant message. In some embodiments, the computer-implemented method further comprises: causing, by the one or more processors, one or more graphical user interfaces to display one or both of: (i) the first notification to the first operator, or (ii) the second notification to the second operator. In some embodiments, the computer-implemented method further comprises: transmitting, by the one or more processors, a third notification of the potential future collision to a third party. In some embodiments, the third party is a government entity. In some embodiments, the third party is another space object operator. In some embodiments, the third notification is the same as one or both of the first notification or the second notification. In some embodiments, the third notification is different than one or both of the first notification or the second notification. In some embodiments, one or both of: (i) the first operator comprises one or more first human operators, or (ii) the second operator comprises one or more second human operators. In some embodiments, one or both of: (i) the first operator comprises one or more first computing devices, or (ii) the second operator comprises one or more second computing devices. In some embodiments, one or both of: (i) the one or more first computing devices comprises a first machine learning model, or (ii) the one or more second computing devices comprises a second machine learning model. In some embodiments, one or both of: (i) the first operator is at least partially ground-based, or (ii) the second operator is at least partially ground-based. In some embodiments, one or both of: (i) the first operator is at least partially space-based, or (ii) the second operator is at least partially space-based. In some embodiments, one or both of: (i) the first operator is at least partially onboard the first space object, or (ii) the second operator is at least partially onboard the second space object. In some embodiments, the communication pathway is implemented via a computer network. In some embodiments, the computer network comprises one or more of: the Internet, an internet, extranet, an intranet that is in communication with the Internet, or an extranet that is in communication with the Internet. In some embodiments, the computer network comprises a telecommunication or data network. In some embodiments, the computer network comprises a peer-to-peer network. In some embodiments, the message is automatically generated by the first operator. In some embodiments, the first operator automatically generates the message via a machine learning model.

In another aspect, a computer-implemented method of collision avoidance between a human-made and a non-human-made space object comprises: (a) receiving, at one or more processors, state data corresponding to a plurality of space objects; (b) identifying, by the one or more processors, based at least in part on the state data, a potential future collision between the human-made space object of the plurality of space objects and the non-human-made space object of the plurality of space objects; and (c) transmitting, by the one or more processors, a notification of the potential future collision to an operator of the human-made space object. In some embodiments, the computer-implemented method further comprises: tracking, via the one or more processors, the plurality of space objects via one or more computer vision techniques. In some embodiments, the method further comprises: performing one or more autonomous coordination operations. In some embodiments, performing the one or more autonomous coordination operations comprises: generating, by the one or more processors, one or more maneuvers for the human-made space object that avoids the potential future collision. In some embodiments, the method further comprises: transmitting, by the one or more processors, the one or more maneuvers to the operator. In some embodiments, the one or more maneuvers avoid or minimize risk of additional potential future collisions between the human-made space object and another space object. In some embodiments, the method further comprises: obtaining, at the one or more processors, a request from the operator to generate the one or more maneuvers. In some embodiments, the method further comprises: obtaining, at the one or more processors, a selected maneuver of the one or more maneuvers from the first operator; and transmitting, by the one or more processors, the selected maneuver to a third party. In some embodiments, the third party is another operator that operates the another space object. In some embodiments, the third party is a government entity. In some embodiments, the human-made space object is operable. In some embodiments, the human-made space object has a controllable trajectory. In some embodiments, the human-made space object is manned. In some embodiments, the human-made space object is one of: a satellite, a rocket, a high-altitude balloon, a space shuttle, a lander, a rover, an orbiter, a space station, a payload, an aircraft, or a telescope. In some embodiments, the plurality of space objects comprise human-made space objects and non-human-made space objects. In some embodiments: (i) the human-made space objects comprise one or more of: a satellite, a rocket, a high-altitude balloon, a space shuttle, a lander, a rover, an orbiter, a space station, a payload, an aircraft, or a telescope; and (ii) the non-human-made space objects comprise one or more of: asteroids, comets, meteors, meteorites, Oort cloud objects, moons, planets, dwarf planets, or stars. In some embodiments, the state data corresponds to one or more of: previous location data for one or more of the plurality of space objects, current location data for one or more of the plurality of space objects, or predicted future location data for one or more of the plurality of space objects. In some embodiments, the state data comprises first predicted future location data for the human-made space object and second predicted future location data for the non-human-made space object. In some embodiments, the first predicted future location data and the second predicted future location data each comprise one or both of snapshot data or timeseries data. In some embodiments, distance data between the first predicted future location data and the second predicted future location data satisfies a threshold. In some embodiments, the distance data comprises a physical distance and an uncertainty. In some embodiments, the uncertainty comprises one or both of a physical distance or a probability. In some embodiments, the potential future collision between the human-made space object and the non-human-made space object of the plurality of space objects is identified based at least in part on the distance data. In some embodiments, the potential future collision is determined via a machine learning model. In some embodiments, the machine learning model comprises a neural network. In some embodiments, the state data comprises one or more of: flight path data, GPS data, acceleration data, rotation data, velocity data, position data, ephemeris data, tracking sensor data, orbital data, or satellite telemetry data. In some embodiments, the notification comprises one or more of: a predicted miss distance, a probability of collision, or a time of collision. In some embodiments, the notification comprise one or more: position information of the human-made space object, ephemeris data of the human-made space object, planned flight paths of the human-made space object, satellite parameters of the human-made space object, flight control data of the human-made space object, autonomous information of the human-made space object, satellite sensor data of the human-made space object, or satellite equipment data of the human-made space object. In some embodiments, the notification comprise one or more: position information of the non-human-made space object, or ephemeris data of the non-human-made space object. In some embodiments, the notification comprises a conjunction data message generated by a government entity. In some embodiments, the notification is one or more of: visual, haptic, or auditory. In some embodiments, the notification is transmitted via one or more of: email, text, phone call, or instant message. In some embodiments, the computer-implemented method further comprises: causing, by the one or more processors, one or more graphical user interfaces to the notification to the operator. In some embodiments, the computer-implemented method further comprises: transmitting, by the one or more processors, another notification of the potential future collision to a third party. In some embodiments, the third party is a government entity. In some embodiments, the third party is another space object operator. In some embodiments, the another notification is the same as the notification. In some embodiments, the another notification is different than the notification. In some embodiments, the operator comprises one or more human operators. In some embodiments, the operator comprises one or more computing devices. In some embodiments, the one or more computing devices comprises a machine learning model. In some embodiments, the operator is at least partially ground-based. In some embodiments, the operator is at least partially space-based. In some embodiments, the operator is at least partially onboard the human-made space object.

In another aspect, a computer system for collision avoidance between human-made space objects comprises: one or more processors; and one or more memories storing computer-executable instructions that, when executed, cause the one or more processors to: (a) receive state data corresponding to a plurality of space objects; (b) identify based at least in part on the state data, a potential future collision between a first space object of the plurality of space objects and a second space object of the plurality of space objects; (c) transmit (i) a first notification of the potential future collision to a first operator of the first space object, and (ii) a second notification of the potential future collision to the second operator of the second space object; (d) establish a communication pathway between the first operator and the second operator; and (e) transmit, via the communication pathway, a message from the first operator to the second operator.

In another aspect, a computer system for collision avoidance between human-made space objects comprises: one or more processors; and one or more memories storing computer-executable instructions that, when executed, cause the one or more processors to: (a) receive state data corresponding to a plurality of space objects; (b) identify, based at least in part on the state data, a potential future collision between the human-made space object of the plurality of space objects and the non-human-made space object of the plurality of space objects; and (c) transmit a notification of the potential future collision to an operator of the human-made space object.

In another aspect, one or more non-transitory computer-readable media comprises computer-executable instructions that, when executed by at least one processor, cause the at least one processor to: (a) receive state data corresponding to a plurality of space objects; (b) identify based at least in part on the state data, a potential future collision between a first space object of the plurality of space objects and a second space object of the plurality of space objects; (c) transmit (i) a first notification of the potential future collision to a first operator of the first space object, and (ii) a second notification of the potential future collision to the second operator of the second space object; (d) establish a communication pathway between the first operator and the second operator; and (e) transmit, via the communication pathway, a message from the first operator to the second operator.

In another aspect, one or more non-transitory computer-readable media comprises computer-executable instructions that, when executed by at least one processor, cause the at least one processor to: (a) receive state data corresponding to a plurality of space objects; (b) identify, based at least in part on the state data, a potential future collision between the human-made space object of the plurality of space objects and the non-human-made space object of the plurality of space objects; and (c) transmit a notification of the potential future collision to an operator of the human-made space object.

Another aspect of the present disclosure provides a system comprising one or more computer processors and computer memory coupled thereto. The computer memory comprises machine executable code that, upon execution by the one or more computer processors, implements any of the method(s) above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
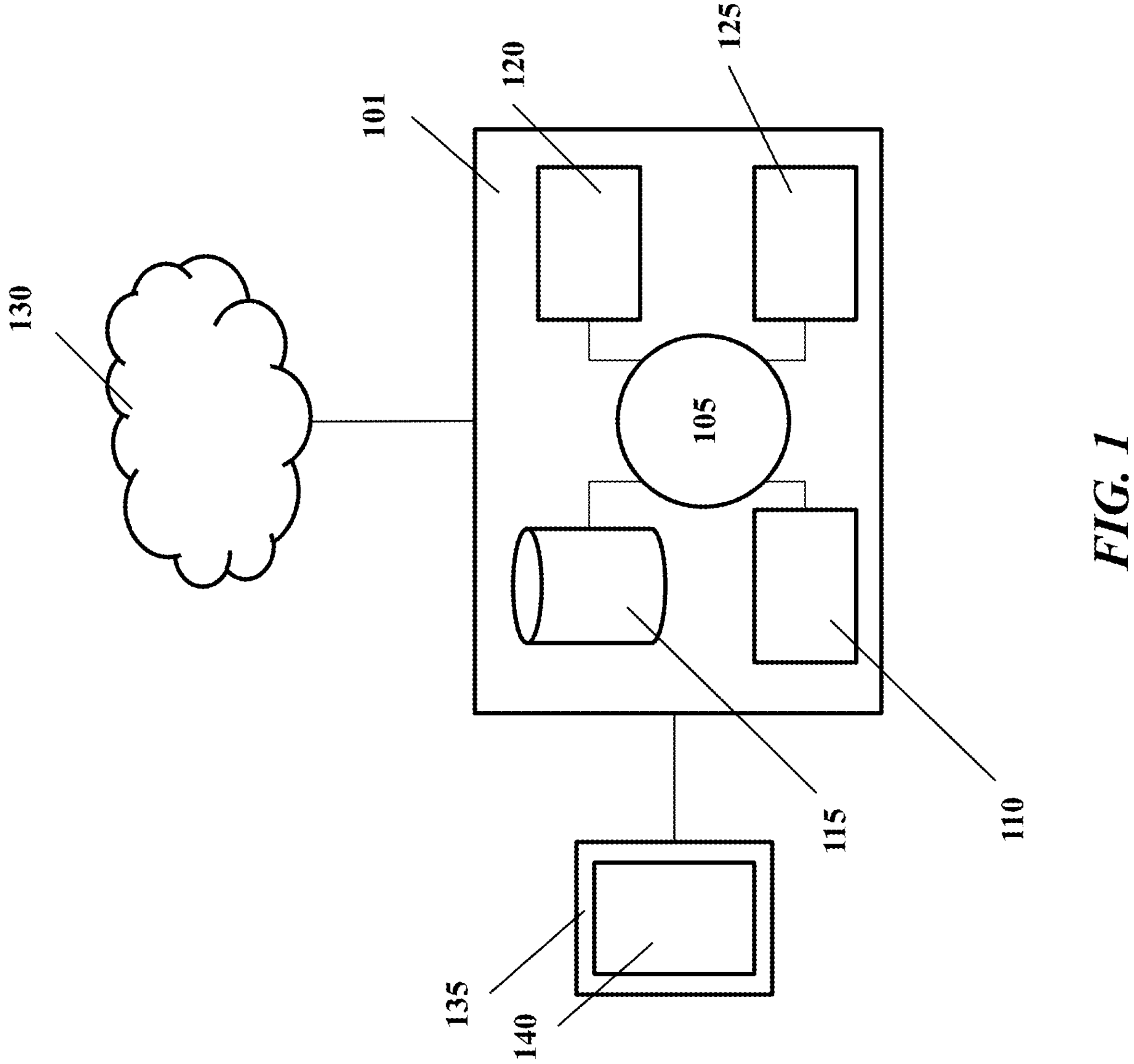
FIG. 1 shows a computer system that is programmed or otherwise configured to implement methods provided herein.

While various embodiments of the invention have been shown and disclosed herein, it will be obvious to those skilled in the art that such embodiments are provided by way of example only. Numerous variations, changes, and substitutions may occur to those skilled in the art without departing from the invention. It should be understood that various alternatives to the embodiments of the invention disclosed herein may be employed.

In some cases, this disclosure describes systems, methods, computer-readable media, and techniques that may enable satellite operators anywhere in the world to receive urgent collision alerts; coordinate satellite maneuvers; and seamlessly communicate, especially during high-risk conjunction events. In some cases, this disclosure further discloses the systems, the methods, the computer-readable media, and the techniques may enable autonomous coordination between satellite operators, specifically, automatically or autonomously sharing of data or messages between satellite operators to aid in avoidance of potential future collisions. In some cases, the systems, the methods, the computer-readable media, and the techniques disclosed herein may enable satellite operators to monitor, track, prepare for, and avoid potential future collisions with space objects.

The systems, the methods, the computer-readable media, and the techniques disclosed herein present numerous advantages over other approaches to reducing collisions in space. Advantageously, the systems, the methods, the computer-readable media, and the techniques disclosed herein reduce network congestion in multiple ways. Firstly, the systems, the methods, the computer-readable media, and the techniques disclosed herein reduce network congestion by establishing communication pathways between operators of space objects at risk for collision. This communication pathway streamlines communication between the operators by quickly creating a data stream for exchanging messages (e.g., automated messages). The systems, the methods, the computer-readable media, and the techniques disclosed herein may also reduce network congestion via reducing space operators' reliance on Conjunction Data Messages (CDMs). As disclosed herein (e.g., in the Background Section), a single operator may receive tens of thousands of CDMs in a single day. Not only does being flooded with this many CDMs often result in operators missing important CDMs, but it also slows down, burdens, and congests networks. Via the systems, the methods, the computer-readable media, and the techniques disclosed herein, operators can receive and focus on the alerts corresponding to potential future collisions that are more important (e.g., have higher probability, require action to avoid, have closes miss distances, etc.).

Also advantageously, the systems, the methods, the computer-readable media, and the techniques disclosed herein leverage a variety of data sources to predict collision risks. For example, data sources include data both onboard space object (e.g., from navigation/flight systems) and outside space objects. Data outside space objects may include data collected by a network of telescopes that may be located, for example, on the ground of Earth, in the atmosphere of Earth, in orbit around Earth, out of orbit around Earth, etc. In some cases, networks of telescopes may collect data corresponding to space objects. In merging all these varied data streams, the systems, the methods, the computer-readable media, and the techniques disclosed herein can achieve greater diversity of data, bringing more insights, more accurate predictions, better modeling, and reduced risk of space collisions.

Certain Definitions and Additional Considerations

Unless otherwise defined, all technical terms used herein have the same meaning as commonly understood by one of ordinary skill in the art to which the present subject matter belongs.

As used in this specification and the appended claims, the term "space object" generally refers to any physical object in space that is either human-made or non-human-made. By way of example, human-made space objects include rockets, high-altitude balloons, satellites, space shuttles, landers, rovers, orbiters, space stations, payloads, mission-related objects, weapons, tools, components, aircraft, command modules, telescopes, automated transfer vehicles, human-made space debris, or other space craft or space vehicles. Human-made space objects may be operable (e.g., live satellites) or inoperable (e.g., dead satellites). Operable human-made space objects may have controllable trajectories. Human-made space objects may be manned (e.g., rockets, space stations, etc.) or unmanned (e.g., satellites, detached rocket components, etc.). By way of example, non-human-made space objects include asteroids, comets, meteors, meteorites, Oort cloud objects, moons, planets, dwarf planets, stars, non-human-made space debris, or other space objects.

Furthermore, while, in some cases, the systems, the methods, the computer-readable media, and the techniques disclosed herein may be described with respect to satellites, the corresponding description may be applicable for one or more other types of space objects (e.g., rockets, space stations, comets, meteors, etc.).

As used in this specification and the appended claims, the terms "artificial intelligence," "artificial intelligence techniques," "artificial intelligence operation," and "artificial intelligence algorithm" generally refer to any system or computational procedure that may take one or more actions to enhance or maximize a chance of achieving a goal. The term "artificial intelligence" may include "generative modeling," "deep learning" (DL), "machine learning", or "reinforcement learning" (RL). As used in this specification and the appended claims, the terms "machine learning," "machine learning techniques," "machine learning operation," and "machine learning model" generally refer to any system or analytical or statistical procedure that may progressively improve computer performance of a task.

As used in this specification and the appended claims, "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used in this specification and the appended claims, when the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

As used in this specification and the appended claims, when the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used in this specification, "or" is intended to mean an "inclusive or" or what is also known as a "logical OR," wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. As such, any reference to "or" herein is intended to encompass "and/or" unless otherwise stated.

As used in this specification and the appended claims, the indefinite articles "a" or "an," and the corresponding associated definite articles "the" or "said," are each intended to mean one or more unless otherwise stated, implied, or physically impossible. Yet further, it should be understood that the expressions "at least one of A and B, etc.," "at least one of A or B, etc.," "selected from A and B, etc." and "selected from A or B, etc." are each intended to mean either any recited element individually or any combination of two or more elements, for example, any of the elements from the group consisting of "A," "B," and "A AND B together," etc.

As used in this specification and the appended claims "about" or "approximately" may mean within an acceptable error range for the value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where values are described in the application and claims, unless otherwise stated the term "about" meaning within an acceptable error range for the particular value may be assumed.

Example Collision Avoidance System

Figure 2:
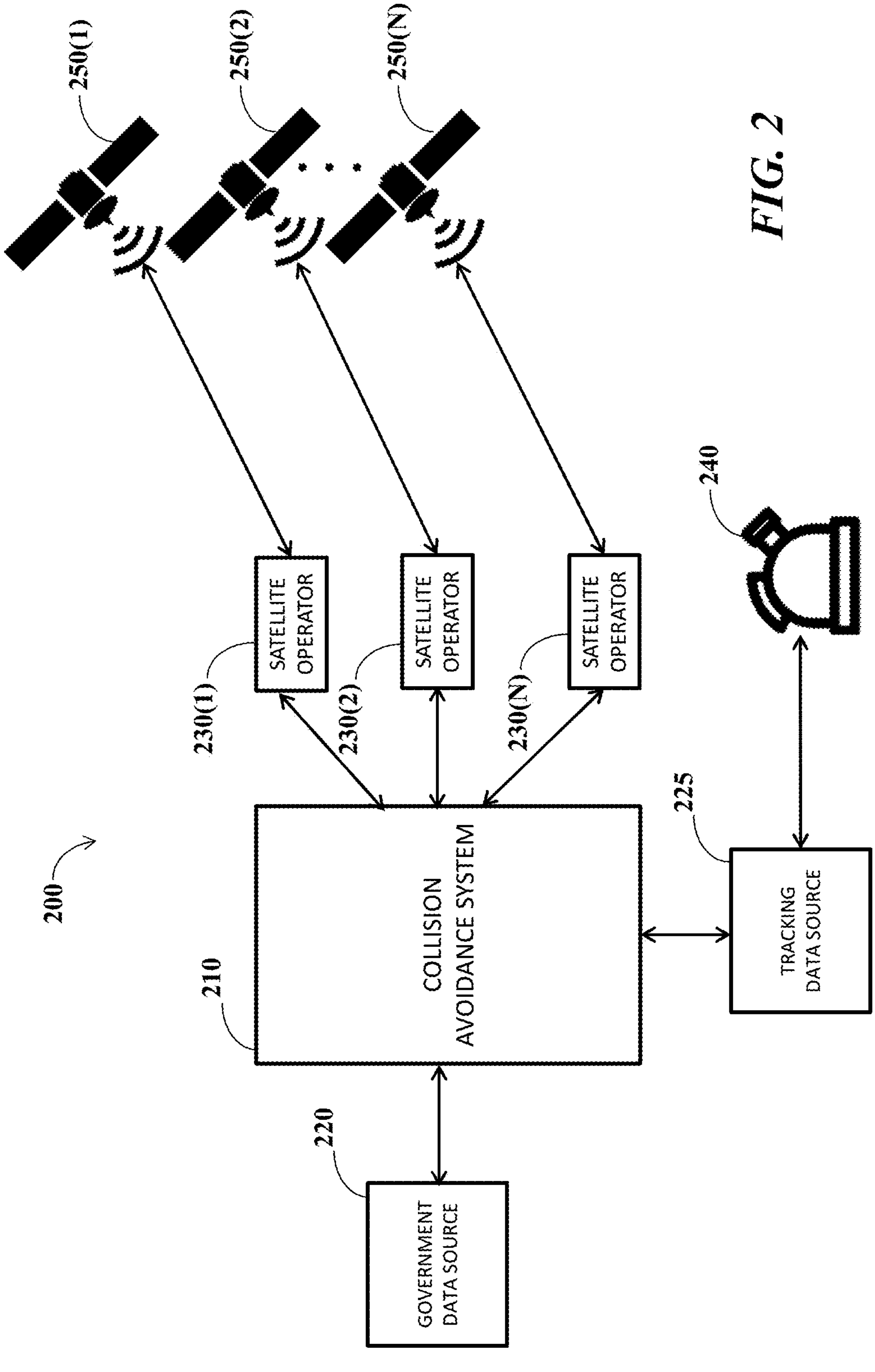
FIG. 2 shows an environment that includes a collision avoidance system communicatively coupled to data sources and satellite operators.

FIG. 2 shows an environment 200 that includes a collision avoidance system 210 that is programmed or otherwise configured to operate any of the systems, the methods, the computer-readable media, and the techniques disclosed herein (such as systems or methods of collision avoidance between space objects, disclosed herein). The environment 200 may further include one or more government data sources 220, one or more tracking data sources 225, one or more satellite operators 230(1)-230(N), one or more tracking sensors 240, and one or more satellites 250(1)-250(N). The data sources 220-225 or the satellite operators 230(1)-230(N) may be communicatively coupled (e.g., via a network, such as a network 130 of FIG. 1, or via hardware, such as a communication bus, etc.) to the collision avoidance system 210.

The collision avoidance system 210 can regulate various aspects of the present disclosure, such as, for example, techniques for collision avoidance between space objects. In some cases, the collision avoidance system 210 may be an electronic device of a user or a computer system that is remotely located with respect to the electronic device. In some cases, the collision avoidance system 210 can be a mobile electronic device. In some cases, the collision avoidance system 210 may be a server which may be implanted as one or more remote or co-located computing devices.

The collision avoidance system 210 can enable satellite operators anywhere in the world to obtain urgent conjunction alerts, coordinate satellite maneuvers, or seamlessly communicate with each other, especially during high-risk moments. The collision avoidance system 210 may generate urgent conjunction alerts in response obtaining a risk of collision for one or more space objects. The collision risk may include one or both of a miss distance between a plurality of space objects or a probability of collision (PC) between the plurality of space objects.

At a high level, the collision data avoidance system 210 may use data ingested from one or both of the government data sources 220 or the tracking data sources 225 to obtain a risk of collision for one or more space objects. Generally, the government data sources 220 may provide government data that includes risk assessments of conjunctions obtained or generated by a government entity (e.g., the 18 SDS, the 19 SDS), and the tracking data sources 225 may provide state data for one or more objects in or near Earth's orbit. The state data may include data that may be used to determine where the object is now, where the object was previously, or where the object will be in the future. For example, the state data may include one or more of: flight path data, GPS data (e.g., acceleration data, rotation data, velocity data, position data, etc.), ephemeris data, tracking sensor data, orbital data, satellite telemetry data, or other suitable data.

The government data may be ingested at the collision avoidance system 210, via, for example, the government data sources 220. In some cases, the government data may include a risk of conjunction for one or more space objects from a government entity at the government data sources 220. The risk of conjunction may include one or both of (i) a prediction of miss distance or the PC, or (ii) an actual urgent conjunction alert (e.g., a CDM). For example, the collision avoidance system 210 may ingest, from the government data sources 220, a plurality of CDMs from the 18 SDS or 19 SDS and filter the plurality of CDMs to identify which CDMs correspond to higher risk conjunctions.

The state data may be ingested at the collision avoidance system 210, via, for example, the tracking data sources 225. The tracking data sources 225 may be computer systems, such as data centers, computer networks, servers, etc. The tracking data sources 225 may be communicatively coupled to the one or more tracking sensors 240 (e.g., a telescope, a network of telescopes, ground-based telescopes, space telescopes, RF, radar, etc.) that may be configured to track or monitor objects in or near Earth's orbit. While the tracking sensors 240 are illustrated as a single system, the tracking sensors 240 may be, in practice, individual systems (e.g., sensors), a plurality of systems (e.g., a plurality of heterogeneous sensors), networks of systems, etc.

In some cases, the tracking sensors 240 may include electro-optical or infrared systems, radar, or radio-frequency data fusion systems. The tracking sensors 240 may include both nighttime and daytime optical tracking techniques to track objects in or near Earth's orbit. In some cases, the tracking sensors 240 may be controllable or taskable by the collision avoidance system 210. For example, the collision avoidance system 210 may instruct (e.g., via submitting tracking requests) one or more tracking sensors 240 communicatively coupled to the tracking data sources 225 to orient facing one or more objects (e.g., one or more of the satellites 250(1)-250(N)) in or near Earth's orbit. In some cases, a user (e.g., a satellite operator) may wish to view more detailed state data of a particular object in or near Earth's orbit. In such cases, the user may input, at the collision avoidance system 210, a request (e.g., a tasking request) to orient the tracking sensors 240 towards the particular object. The tracking data sources 225 may provide "snapshot" data (e.g., a current position or velocity of an object) or timeseries data (e.g., flight path data of an object over a period of time) provided to the tracking data sources 225 via the tracking sensors 240. In some cases, the tracking sensors 240 may implement one or more computer vision techniques to identify one or more space objects. In some cases, the tracking sensors 240 may implement one or more computer vision techniques to track one or more space objects.

In some cases, once the collision avoidance system 210 ingests data from one or both of the government data sources 220 or the tracking data sources 225, the collision avoidance system 210 may determine a risk of collision for one or more satellites. The collision avoidance system 210 may determine the risk of collision via artificial intelligence/machine learning techniques or statistical modeling techniques. In addition to the government data or the state data ingested respectively from the government data sources 220 or the tracking data sources 225, the collision avoidance system 210 may use historical data (e.g., data corresponding to previous space object near misses or collisions) to predict the risk of collision.

In some cases, the collision avoidance system 210 may include a dashboard (presented at, for example, a graphical user interface, such as the UI 140 of FIG. 1) that may display current and future (e.g., predicted) states of one or more space objects in a customizable arrangement. The collision avoidance system 210 may enable satellite operators to cut through the noise of irrelevant data by filtering conjunction alerts. For example, the operator may be able to filter conjunction alerts based at least in part on time of collision (TCA), such as only displaying conjunction alerts for potential future collision predicted to occur in the next 1 hour, 2 hours, 3 hours, 4 hours, 5 hours, 6 hours, 12 hours, 24 hours, 36 hours, 48 hours, 72 hours, 96 hours, or another desired amount of time. In another example, the operator may be able to filter conjunction alerts based at least in part on space object, such as only displaying conjunction alerts for potential future collisions predicted to include one or more particular space objects. In another example, the operator may be able to filer collisions predicted to include one or more particular satellite operators (e.g., primary satellite operator, secondary satellite operator, etc.). In another example, the operator may be able to filter conjunction alerts based at least in part on risk, such as only displaying conjunction alerts for potential future collisions predicted to have a particular miss distance or a particular PC. In another example, the operator may be able to filter conjunction alerts based at least in part on maneuverability of a space object. In another example, the operator may be able to filter conjunction alerts based at least in part on a type of space object (e.g., operable space object, inoperable space object, space debris, meteor, etc.). In another example, the operator may be able to filter conjunction alerts based at least in part on conjunction status and responsibility (e.g., autopilot status).

In some cases, the collision avoidance system 210 may highlight more risky situations in the dashboard, by color coding, such as, more risky situations associated with the color red, moderately risky situations associated with the color yellow, less risky situations associated with the color green. In some cases, the collision avoidance system may group conjunction alerts in buckets based at least in part on time, risk, space object, space object operator, or any other suitable parameter.

In some cases, the collision avoidance system 210 may enable coordination between the satellite operators 230(1)-230(N) of the satellites 250(1)-250(N). While the satellites 250(1)-250(N) are illustrated as individual satellites respectively communicatively coupled to the satellite operators 230(1)-230(N), respectively, each of the satellites 250(1)-250(N) may be, in practice, individual space objects, a plurality of space objects, constellations of space objects, etc. At a high level, the ability to avoid collisions between the satellites 250(1)-250(N) may be improved by coordination between the satellite operators 230(1)-230(N) of the satellites 250(1)-250(N) so that, in some cases, each operator knows what each other operator is planning to do.

In some cases, the collision avoidance system 210 may provide the satellite operators 230(1)-230(N), with a way to (i) share data, and (ii) coordinate maneuvers. In some cases, sharing data may include, for example, using the collision avoidance system 210 to share common data among each of one or more of the satellite operators 230(1)-230(N). While in other cases, sharing data may include, for example, using the collision avoidance system 210 to share different levels of data among each of one or more of the satellite operators 230(1)-230(N). In such cases, different levels of data may be shared, for example, via pay tiers of the satellite operators 230(1)-230(N). Different levels of data may be based at least in part on, for example, varied levels of analytics, graphics, data size, etc.

Coordination between the satellite operators 230(1)-230(N) of the satellites 250(1)-250(N) may be enabled via one or more communication pathways between the satellite operators 230(1)-230(N). In some cases, the communication pathways may be implemented through the collision avoidance system 210 (e.g., a communication pathway established from satellite operator 230(1) to the collision avoidance system 210 to the satellite operator 230(2)). In some cases, the communication pathways may be implemented as direct, operator-to-operator communication pathways (e.g., a communication pathway established from the satellite operator 230(1) directly to the satellite operator 230(2)). In some cases, communication pathways may be established between more than two satellite operators of the satellite operators 230(1)-230(N) (e.g., a communication pathway established between satellite operator 230(1), satellite operator 230(2), satellite operator 230(3), and satellite operator 230(4)).

In some cases, the collision avoidance system 210 may enable the satellite operators 230(1)-230(N) to share (e.g., via a communication pathway) data (e.g., planned flight paths, ephemeris data, satellite parameters, flight control data, autonomous information, satellite sensor data, satellite equipment data, contact information, etc.) between each other. For example, the collision avoidance system may ingest a planned flight path (or any other type of state data) from the satellite operator 230(1) and then transmit this planned flight path to the satellite operator 230(2). Data may be shared between the satellite operators 230(1)-230(N) over the collision avoidance system 210 by utilizing application programming interfaces (APIs) corresponding to each of the satellite operators 230(1)-230(N). In another example, the collision avoidance system may ingest (e.g., from government data (e.g., the government data source 220), directly from users, etc.) contact information (e.g., email addresses, phone numbers, mailing addresses, etc.) for the satellite operator 230(1) and then transmit this contact information to the satellite operator 230(2).

In some cases, the collision avoidance system 210 may enable the satellite operators 230(1)-230(N) to coordinate maneuvers. Coordinating maneuvers may be done via sharing data as previously disclosed or by exchanging messages. The messages may be shared via a chat function in the collision avoidance system 210 that may enable one satellite operator of the satellite operators 230(1)-230(N) to send and receive messages from another satellite operator of the satellite operators 230(1)-230(N). For example, the satellite operator 230(1) may send a message to the satellite operator 230(2) inquiring if autopilot is enabled on the satellite 250(2), and, in turn, the satellite operator 230(2) may send a message to the satellite operator 230(1) indicating that autonomous is enabled on the satellite 250(2) and they have maneuver responsibility. In some cases, messages between the satellite operators 230(1)-230(N) exchanged over the collision avoidance system 210 may be generated (e.g., composed) manually by human operators or automatically by autonomous systems. As the satellite operators 230(1)-230(N) may often receive a large number of conjunction notifications, autonomous coordination with automatically-generated messages may increase feasibility of addressing each conjunction notification.

Autonomous coordination may include the sharing of data between the satellite operators 230(1)-230(N) autonomously, or exchanging of messages (e.g., requests for information and answers to requests) autonomously. Each of the satellite operators 230(1)-230(N) may be able to configure their own autonomous preferences over the collision avoidance system 210. For example, the satellite operator 230(1) may configure their autonomous preferences to autonomously request planned flight path data from any other of the satellite operators 230(1)-230(N) for which they have a conjunction notification with a TCA within 24 hours.

In some cases, autonomous coordination may further include coordinating maneuvers between the satellite operators 230(1)-230(N). For example, the collision avoidance system 210 may suggest one or more recommended maneuvers to the satellite operators 230(1)-230(N) that avoids a collision corresponding to a conjunction notification. In another example, the collision avoidance system 210 may suggest one or more recommended maneuvers to the satellite operators 230(1)-230(N) that minimizes or prevents creating other potential future collisions. In some cases, the collision avoidance system 210 may transmit recommended maneuvers to the satellite operators 230(1)-230(N). In some cases, one of the satellite operators 230(1)-230(N) may transmit a planned or recommended maneuver to another one of the satellite operators 230(1)-230(N). In some cases, one of the satellite operators 230(1)-230(N) may request a recommended maneuver from the collision avoidance system 210 or from another one of the satellite operators 230(1)-230(N). In sharing planned or recommended maneuvers via the collision avoidance system 210, uncertainty may be reduced and the satellite operators 230(1)-230(N) may be able to plan flight paths and maneuvers with greater confidence.

Example Method of Collision Avoidance Between Space Objects

Figure 3:
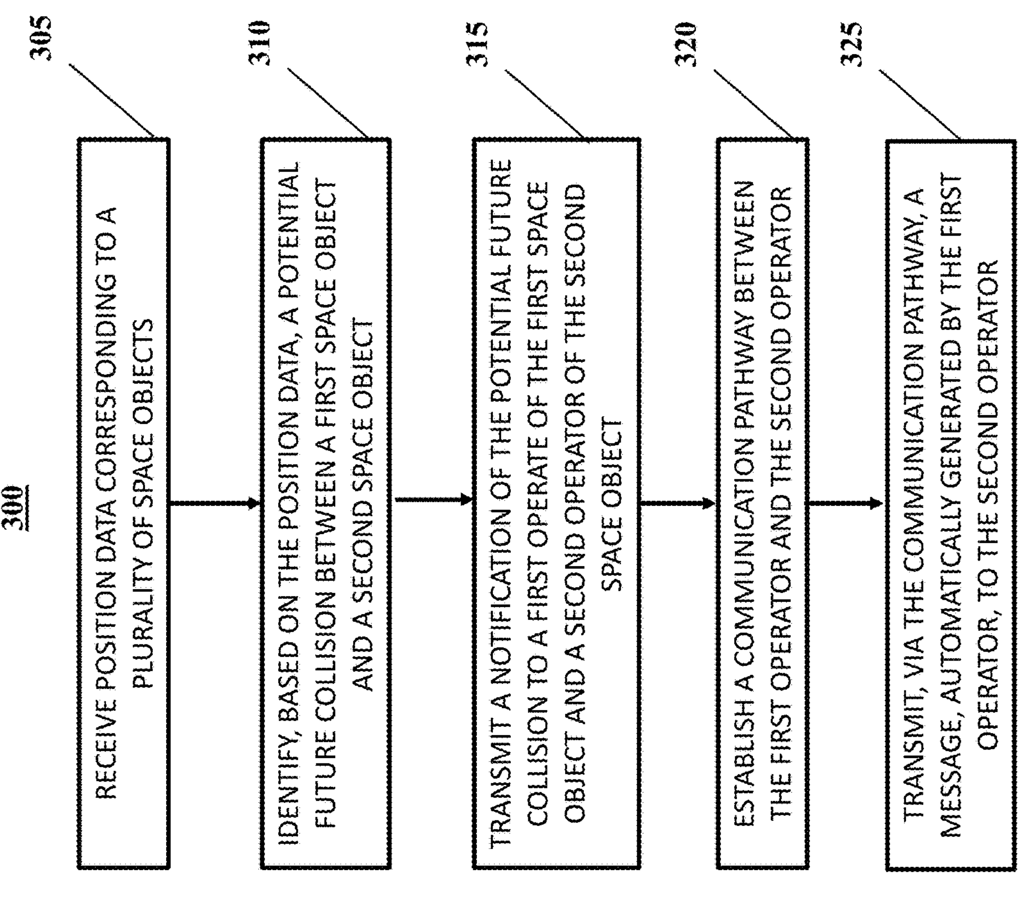
FIG. 3 illustrates an example method of collision avoidance between satellites.

FIG. 3 depicts an example method 300 of collision avoidance between space objects (e.g., the satellites 250(1)-250(N)). At a high level, the method may include (a) receiving state data corresponding to a plurality of space objects (block 305); (b) identifying, based at least in part on the state data, a potential future collision between a first space object and a second space object (block 310); (c) transmitting a notification of the potential future collision to a first operator of the first space object and a second operator of the second space object (block 315); (d) establishing a communication pathway between the first operator and the second operator (block 320); and (e) transmitting, via the communication pathway, a message, automatically generated by the first operator, to the second operator (block 325). Some aspects of the method 300 may be implemented using a computer system that may be the same as or similar to the computer system 101 of FIG. 1 or the environment 200 of FIG. 2. In some cases, the operations of the blocks 305-325 of the method 300 disclosed herein may include more, fewer, or other operations. In some cases, the operations of the blocks 305-325 of the method 300 may be performed in any suitable order. In some cases, one or more of the operations of the blocks 305-325 of the method 300 may be repeated, e.g., iteratively.

In some cases, the method 300 may begin with receiving state data corresponding to the plurality of space objects at the block 305. Generally, the state data may include data that may be used to determine where one or more of the space objects are now, previously, or will be in the future. For example, the state data may include one or more of: flight path data, GPS data, ephemeris data, spatial sensor data, accelerometer data, velocity data, rotation data, orbital data, or other suitable data. In some cases, at the block 305, state data of non-human-made space objects (e.g., space junk, debris, asteroids, meteors, meteorites, meteoroids, rockets, or other physical objects that are either in or near Earth's orbit) may also be received. The state data may be received from, for example, one or more tracking data sources (e.g., the tracking data sources 225 of FIG. 2). The state data may be received by, for example, a computer system (e.g., the computer system 101 of FIG. 1 or the collision avoidance system 210 of FIG. 2).

At the block 310, the method 300 may identify, based at least in part on the state data, the potential future collision between the first space object and the second space object. The potential future collision may be identified (e.g., by the computer system 101 of FIG. 1 or the collision avoidance system 210 of FIG. 2) via artificial intelligence/machine learning techniques or statistical modeling techniques. In some cases, in addition to the state data, identifying the potential future collision may be based at least in part on government data (that may be received from, for example, the government data sources 220) that may include a risk of conjunction (e.g., a prediction of miss distance or PC, an actual urgent conjunction alert such as CDMs, etc.). In some cases, in addition to the state data, historical data may be used in identifying the potential future collision, particularly when using artificial intelligence/machine learning techniques. In some cases, trends may be monitored and identified. For example, trends for specific space objects may be monitored. Specific space objects that have a trend of increasing PC may be flagged (e.g., for more careful monitoring).

At the block 315, the method 300 may transmit the notification of the potential future collision to the first operator (e.g., one of the of the satellite operators 230(1)-230(N) of FIG. 2) first space object and the second operator (e.g., one of the of the satellite operators 230(1)-230(N) of FIG. 2) of the second space object. The notification may be visual, haptic, or auditory in format. The notification may be displayed on a graphical user interface (e.g., the UI 140 of FIG. 1), such as a dashboard (e.g., the dashboard of the collision avoidance system 210 of FIG. 2) that may display current and future (e.g., predicted) states of one or more space objects in a customizable arrangement with filters or highlights. In some cases, the notification may include a CDM (prepared by, for example, a government entity). In some cases, the notification may be transmitted to the first operator and the second operator via one or more of email, text, phone call, instant message, etc. In some cases, more or fewer entities than the first operator and the second operator may receive the notification in response to the potential future collision between the first space object and the second space object. For example, a government entity may additionally receive the notification of the potential future collision. The notification of the potential future collision may include information about the potential future collision such as one or more of: a predicted miss distance, PC, TCA, information about the first space object (e.g., position information, ephemeris data, planned flight paths, satellite parameters, flight control data, autonomous information, satellite sensor data, satellite equipment data, etc.), information about the second space object (e.g., position information, ephemeris data, planned flight paths, satellite parameters, flight control data, autonomous information, satellite sensor data, satellite equipment data, etc.), or other relevant information pertaining to the potential future collision.

At the block 320, the method 300 may establish a communication pathway between the first operator and the second operator. The communication pathway may enable communicating between the first operator and the second operator and may be the same as or similar to the communication pathways described with respect to FIG. 2. The communication pathway may be implemented via a computer network (e.g., the network 130 of FIG. 1) with the aid of one or more communication interfaces (e.g., the communication interface 120 of FIG. 1). The computer network can be the Internet, an internet or extranet, or an intranet or extranet that is in communication with the Internet. The computer network may be a telecommunication or data network. The computer network may include one or more computer servers, which can enable distributed computing, such as cloud computing. The computer network may implement a peer-to-peer network (e.g., operator-to-operator communication pathway).

At the block 325, the method 300 may transmit, via the communication pathway, the message, automatically generated by the first operator, to the second operator. At a high level, the message may include one or more of text data or file data, such as image data, video data, audio data, flight data, etc. The message may include space object data (e.g., planned flight paths, ephemeris data, space object parameters, flight control data, autonomous information, space object sensor data, space object equipment data, etc.). The message may include a planned or recommended maneuver. The message may include an inquiry or request for data/information (e.g., a recommended maneuver). The messages may be shared via a chat function (e.g., in the collision avoidance system 210) that may enable the first operator and the second operator to exchange messages. As previously described, the message may be generated by the first operator autonomously/automatically (at, for example the collision avoidance system 210 of FIG. 2). Each of the first space object operator and the second space object operator may be able to configure their own autonomous preferences. In some cases, once the message is received by the second operator, the second operator may generate (automatically or manually) a reply message that may be transmitted to the first operator via the communication pathway. In this manner, additional messages/replies may be generated and transmitted back and forth between the first operator and the second operator. As such, because space object operators may often receive and generate a large number of messages, automatic message generation may increase feasibility of addressing each potential future collision notification.

At the block 325, the method 300 may transmit, via the communication pathway, the message, automatically generated by the first operator, to the second operator. At a high level, the message may include one or more of text data, image data, video data, audio data, etc. The message may include space object data (e.g., planned flight paths, ephemeris data, space object parameters, flight control data, autonomous information, space object sensor data, space object equipment data, etc.). The message may include a planned or recommended maneuver. The message may include an inquiry or request for data/information (e.g., a recommended maneuver). The messages may be shared via a chat function (e.g., in the collision avoidance system 210) that may enable the first operator and the second operator to exchange messages. As previously described, the message may be generated by the first operator autonomously/automatically (at, for example the collision avoidance system 210 of FIG. 2). Each of the first space object operator and the second space object operator may be able to configure their own autonomous preferences. In some cases, once the message is received by the second operator, the second operator may generate (automatically or manually) a reply message that may be transmitted to the first operator via the communication pathway. In this manner, additional messages/replies may be generated and transmitted back and forth between the first operator and the second operator. As such, because space object operators may often receive and generate a large number of messages, automatic message generation may increase feasibility of addressing each potential future collision notification.

Example Dashboards

As previously-discussed, the systems, methods, and techniques disclosed herein may be implemented at least in part with the use of a dashboard that may be presented on a graphical user interface (e.g., the UI 140 of FIG. 1). FIGS. 4-10 illustrate example dashboards. At a high level, the FIGS. 4-10 may display current and future (e.g., predicted) states of one or more space objects (e.g., the satellites 250(1)-250(N)) in a customizable arrangement, may enable space object operators to cut through the noise of irrelevant data by filtering conjunction alerts, may enable the space object operators to share data (e.g., planned flight paths, ephemeris data, space object parameters, flight control data, autonomous information, space object sensor data, space object equipment data, etc.), or may enable the space object operators to coordinate maneuvers (e.g., via manual or autonomous coordination).

Figure 4A:
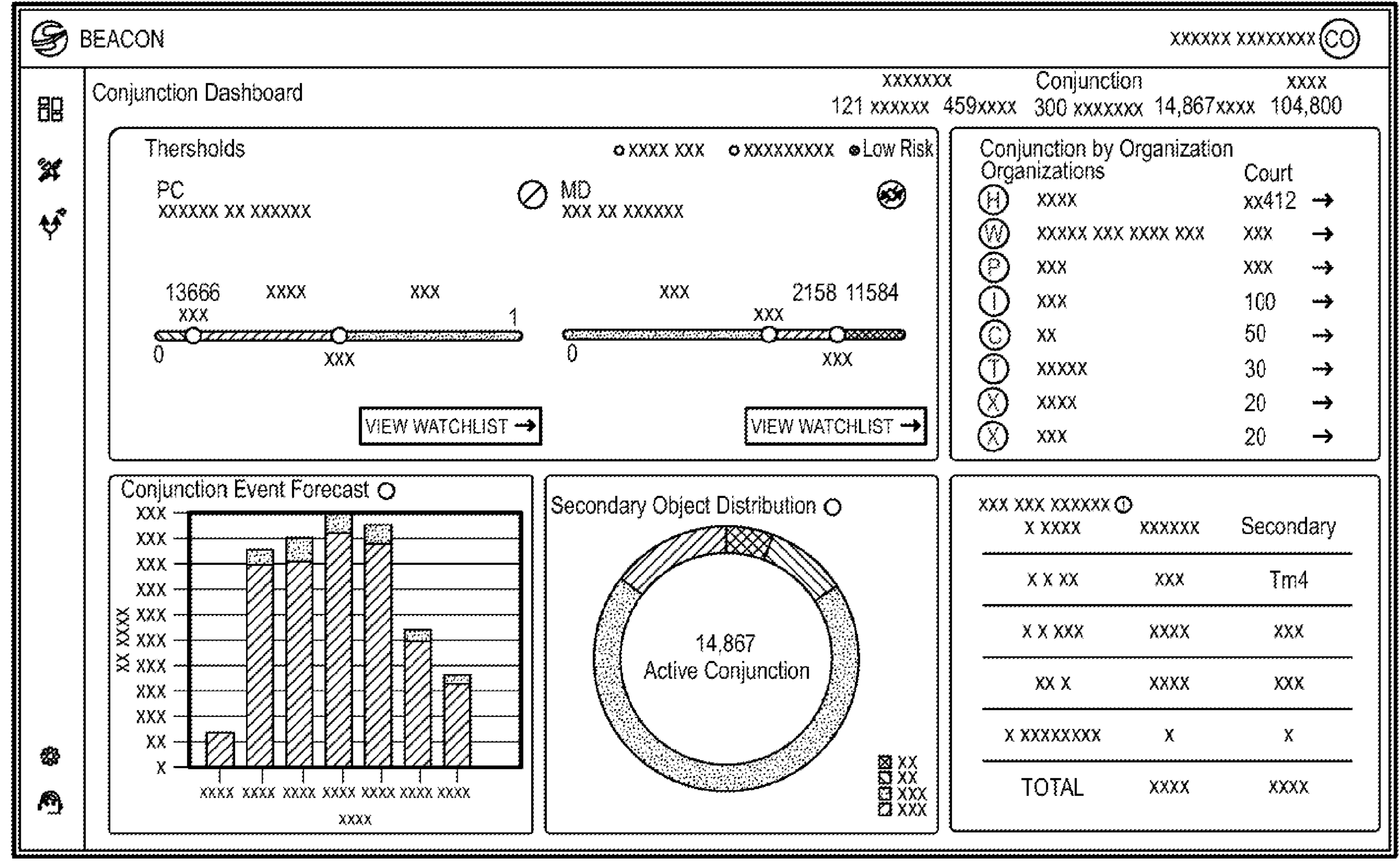
FIG. 4A illustrates an example dashboard for viewing possible conjunctions on a graphical user interface, consistent with certain examples of the present disclosure.
Figure 4B:
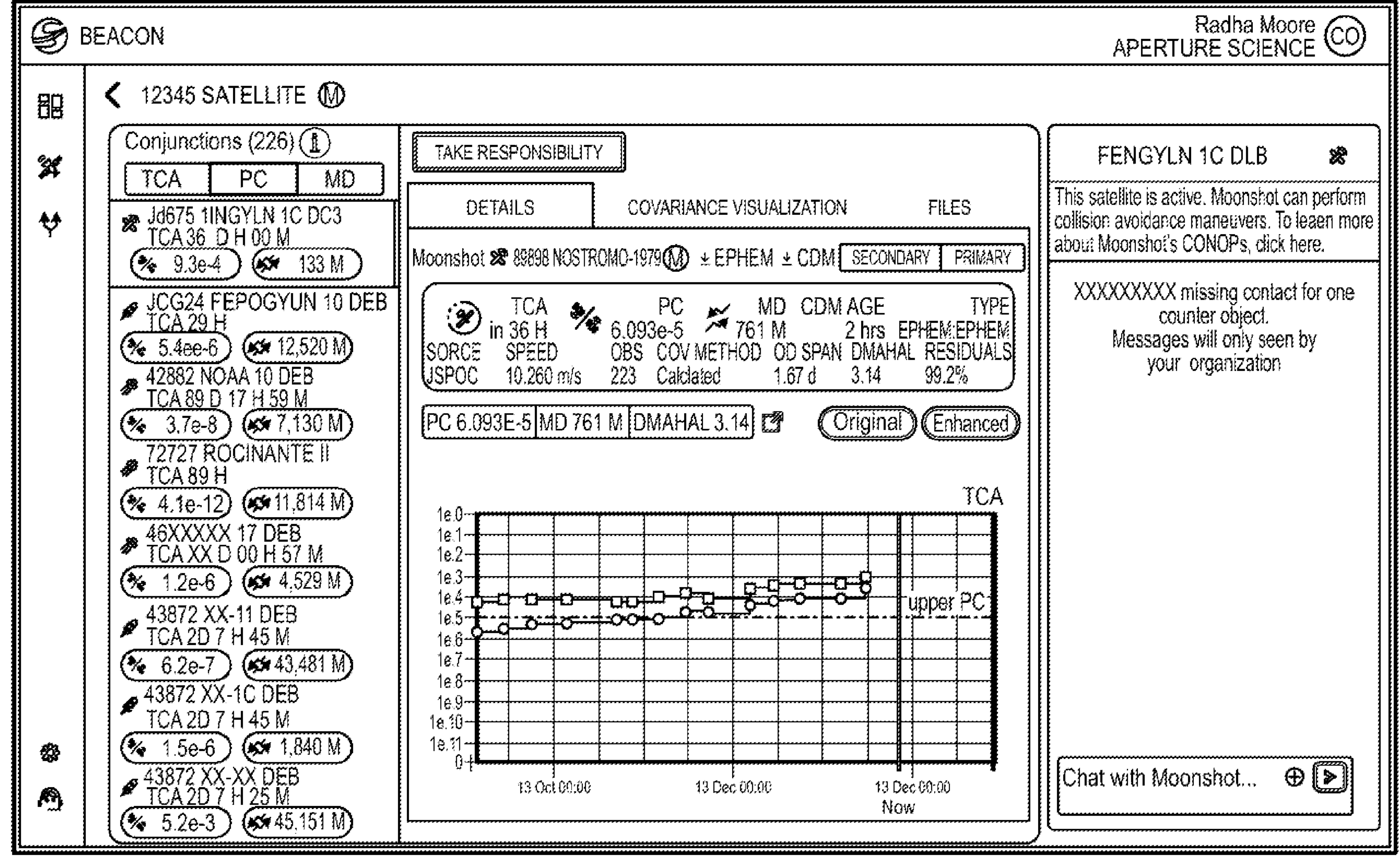
FIG. 4B illustrates an example dashboard for performing collision avoidance coordination and communications on a graphical user interface, consistent with certain examples of the present disclosure.
Figure 4C:
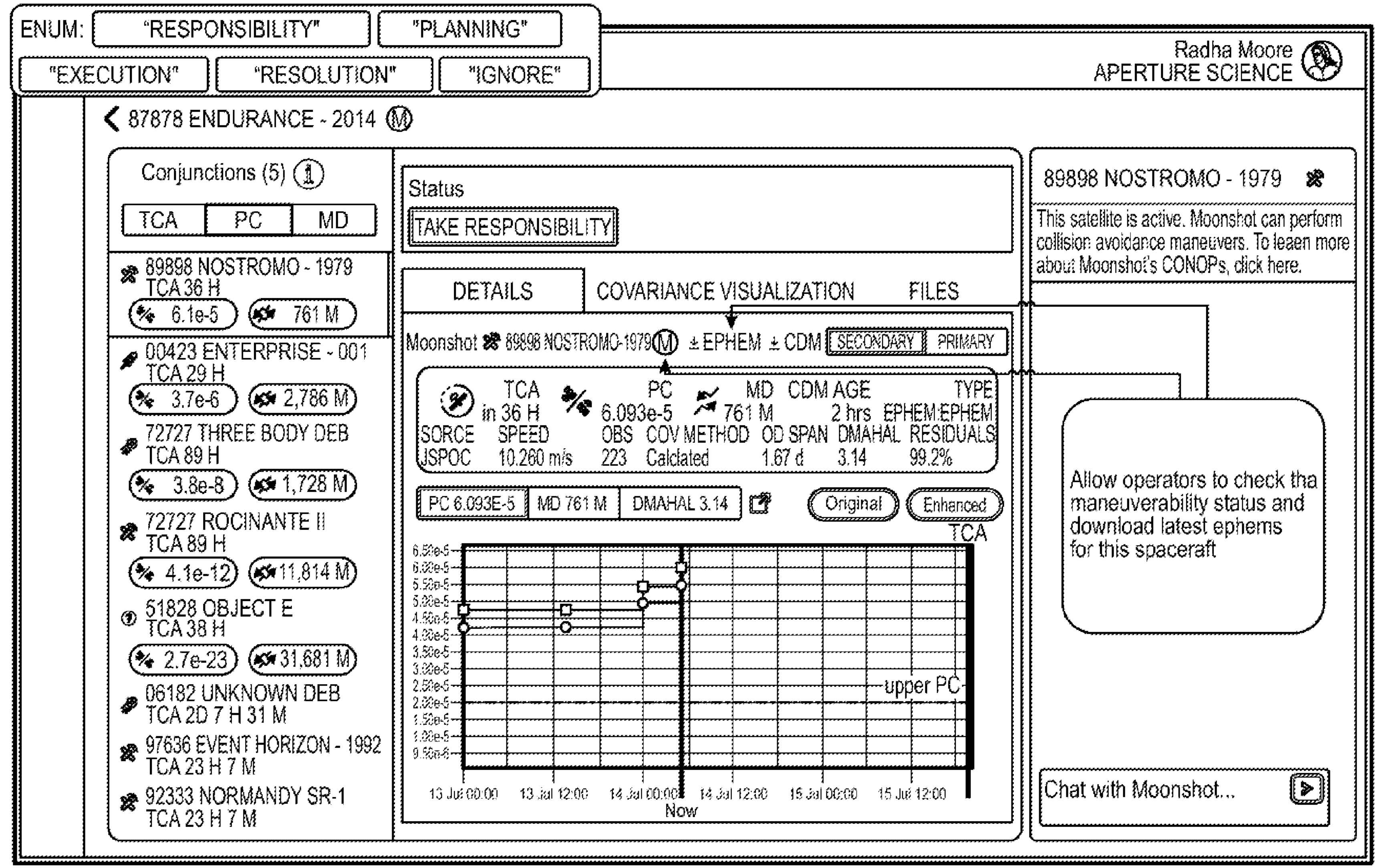
FIG. 4C illustrates an example dashboard for viewing ephemeris data on a graphical user interface, consistent with certain examples of the present disclosure.
Figure 4D:
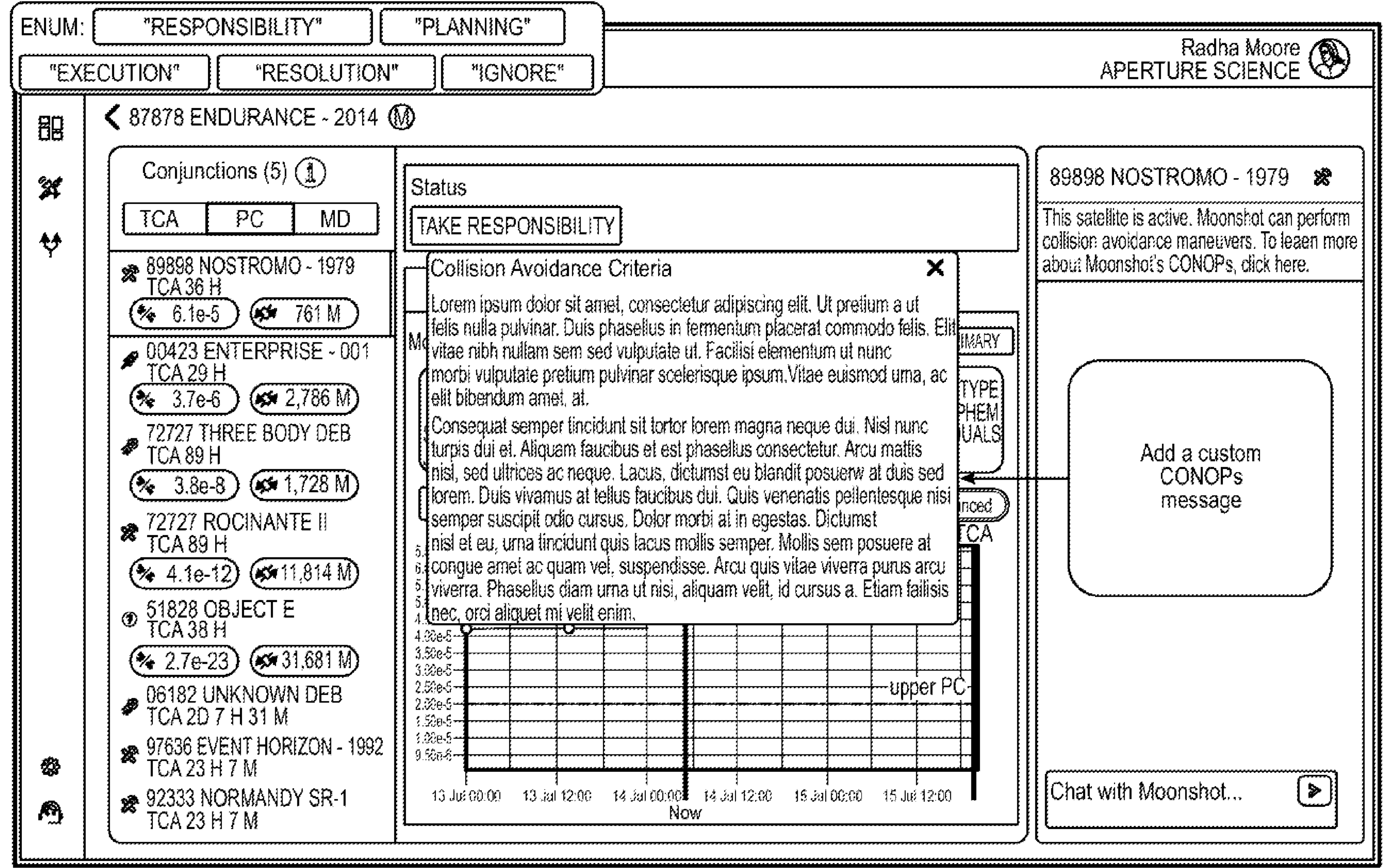
FIG. 4D illustrates an example dashboard for viewing text corresponding to concept of operations on a graphical user interface, consistent with certain examples of the present disclosure.

A dashboard presented at FIGS. 4A and 4B may be used in the collision avoidance coordination and communications platforms. As illustrated on FIG. 4C, a dashboard presented at FIG. 4C may have functionality to enable a user to view ephemeris data in response to user input. The ephemeris data may be viewable by the operator of the space object for which the ephemeris data corresponds, and, in some cases, the ephemeris data may be shareable with other operators of other space objects. As illustrated on a dashboard included at FIG. 4D, the dashboard may have functionality to receive text corresponding to concept of operations (CONOPs) for a space object. The CONOPs message may be composed by a human (e.g., a human operator) or automatically (e.g., a machine operator). The CONOPs message may be shareable with outside space object operators.

Figure 4E:
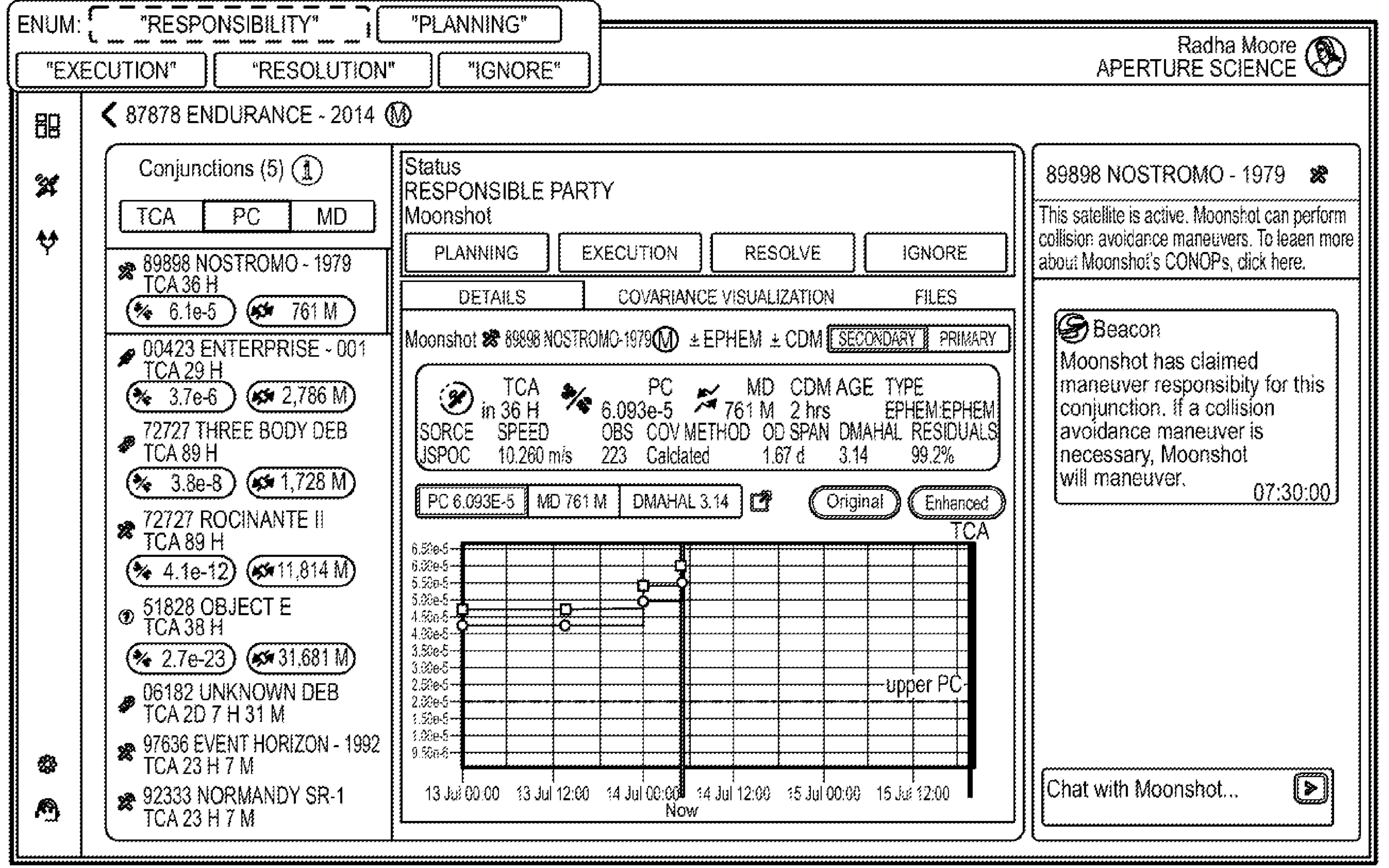
FIG. 4E illustrates another example dashboard for claiming maneuver responsibility on a graphical user interface, consistent with certain examples of the present disclosure.
Figure 4F:
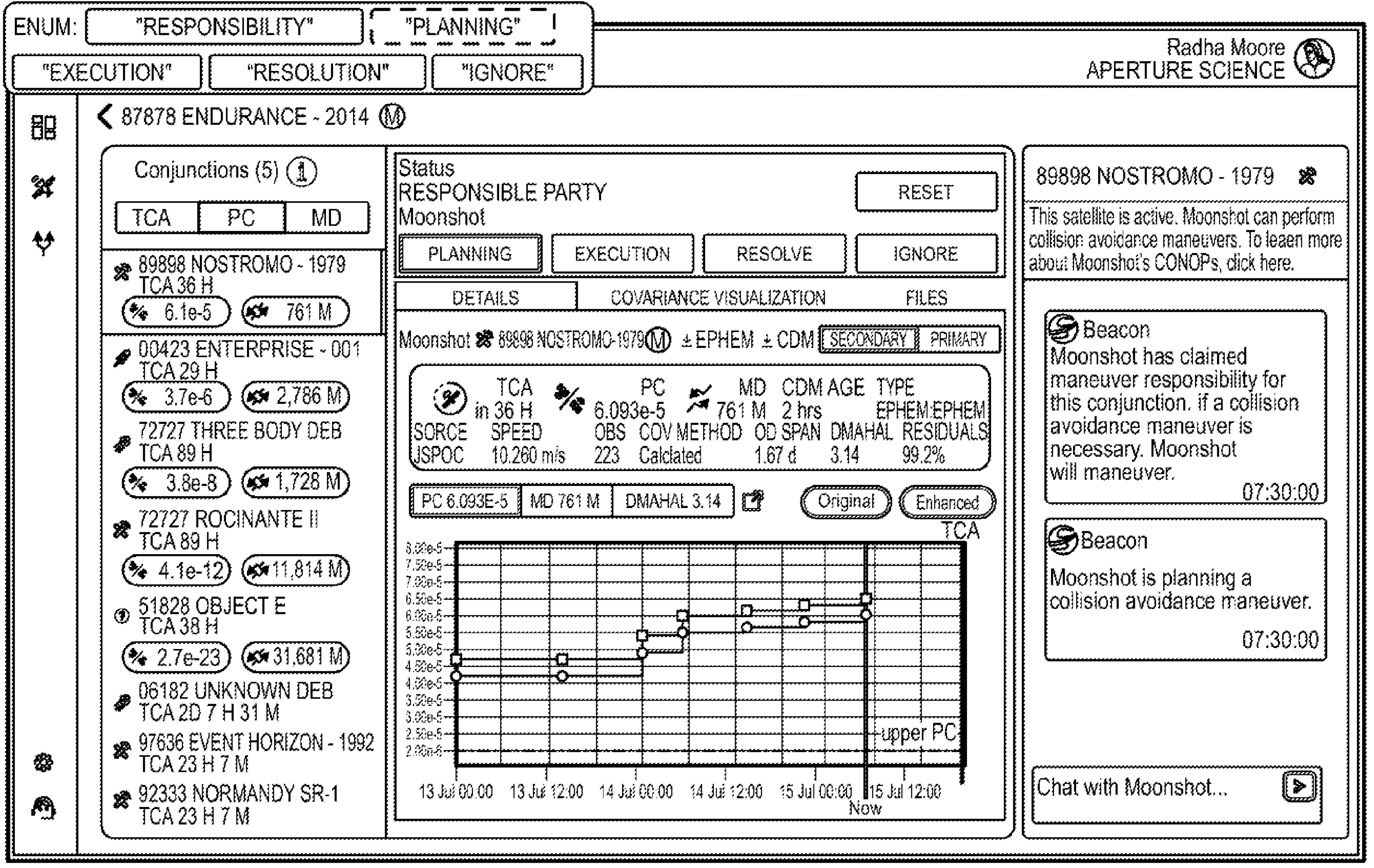
FIG. 4F illustrates another example dashboard for planning a maneuver on a graphical user interface, consistent with certain examples of the present disclosure.
Figure 4G:
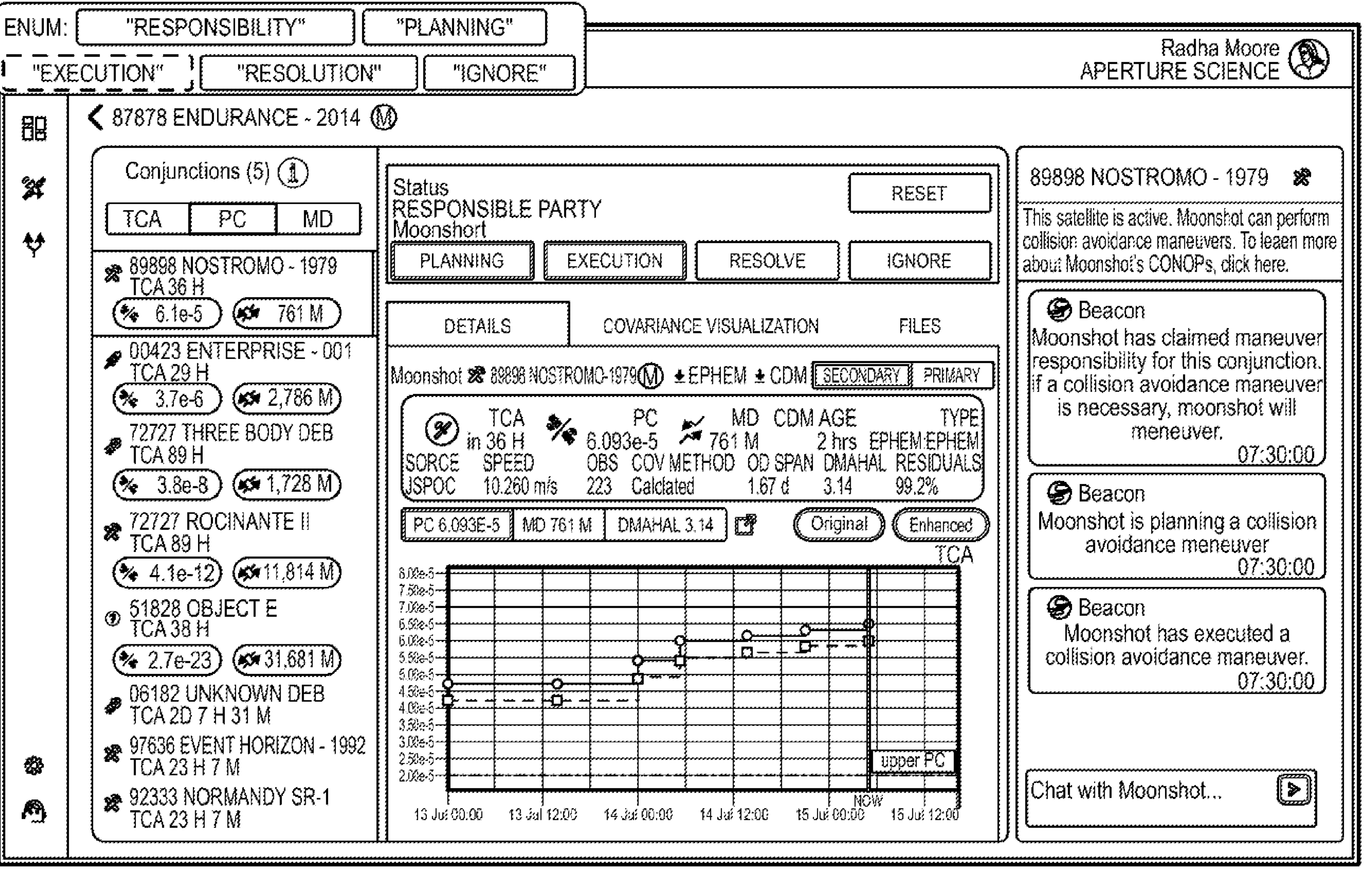
FIG. 4G illustrates another example dashboard for executing a maneuver on a graphical user interface, consistent with certain examples of the present disclosure.
Figure 4H:
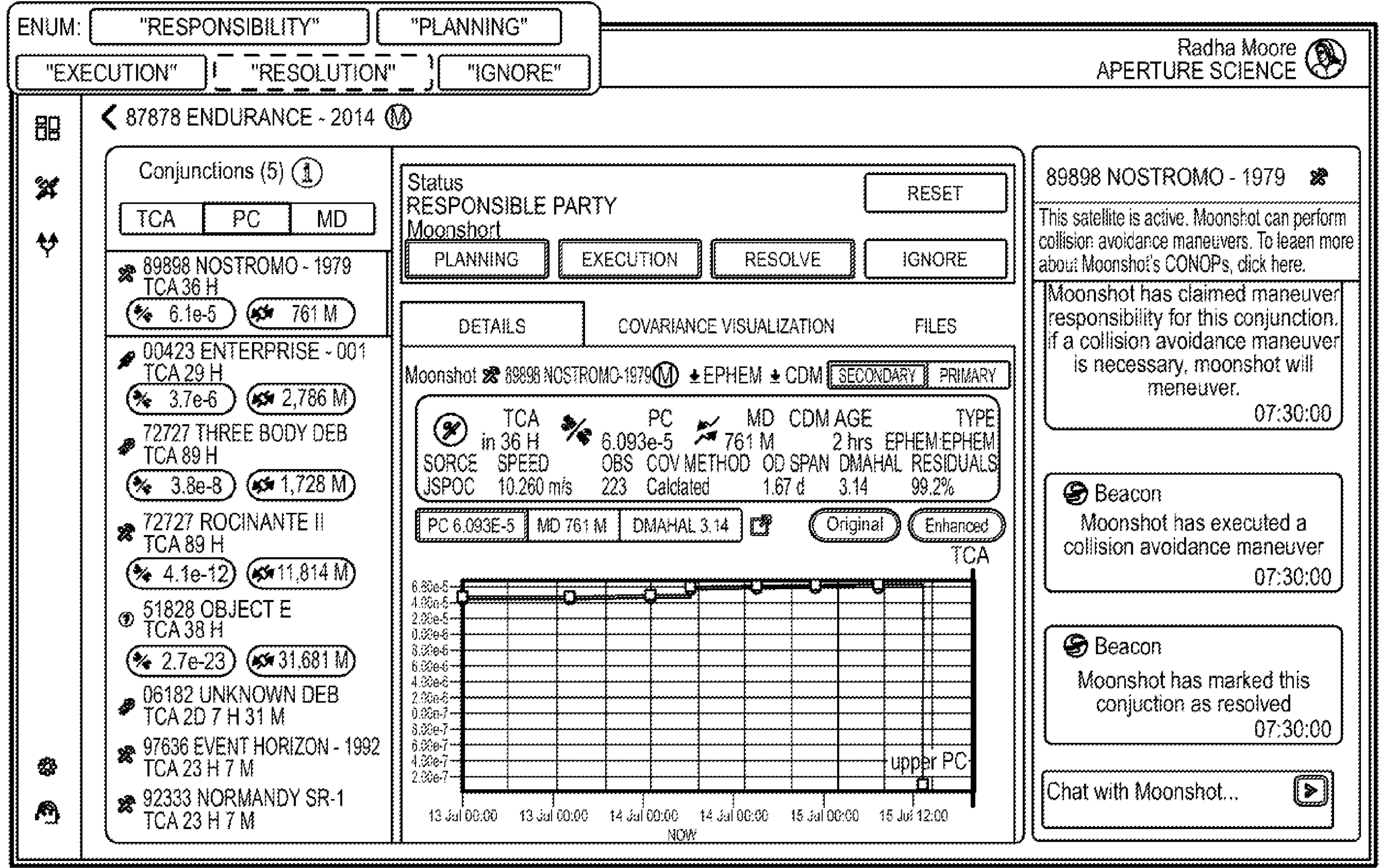
FIG. 4H illustrates another example dashboard for marking a conjunction on a graphical user interface, consistent with certain examples of the present disclosure.
Figure 4I:
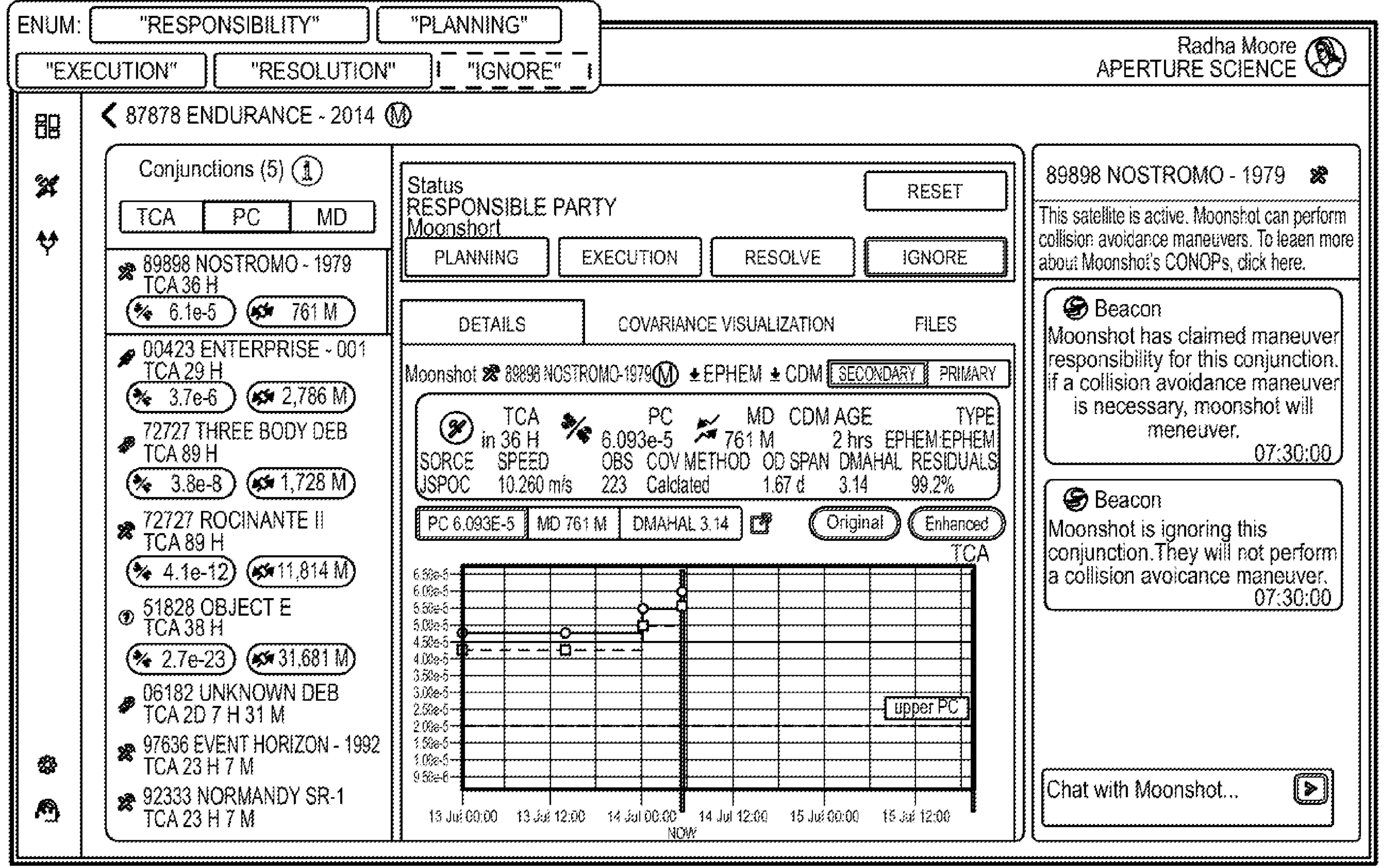
FIG. 4I illustrates another example dashboard for dismissing a conjunction on a graphical user interface, consistent with certain examples of the present disclosure.

At FIG. 4E, an example of an operator claiming maneuver responsibility is depicted. The maneuver responsibility may be claimed by a human or automatically. The maneuver responsibility may be shared with outside space object operators. At FIG. 4F, an example of an operator planning a maneuver is depicted. The maneuvers may be planned by a human or automatically implemented. The maneuver planning may be shared with outside space object operators. At FIG. 4G, an example of an operator executing a maneuver is depicted. The maneuvers may be executed by a human or automatically. The maneuver execution may be shared with outside space object operators. At FIG. 4H, an example of an operator marking a conjunction as resolved is depicted. The conjunction may be marked as resolved by a human or automatically. The resolution may be shared with outside space object operators. At FIG. 4I, an example of an operator ignoring a conjunction is depicted. The conjunction may be ignored by a human or automatically. The ignoring of the conjunction may be shared with outside space object operators.

While FIGS. 4A-4F depict certain actions that may be taken using a dashboard, any of the present methods, systems, and techniques may be implemented using a user interface such as the UI 140 of FIG. 1.

Example Computer System

The present disclosure provides computer systems that are programmed to implement methods of the disclosure. FIG. 1 shows a computer system 101 that is programmed or otherwise configured to operate any system, method, computer-readable media, or technique disclosed herein (such as systems or methods of collision avoidance between space objects, disclosed herein). In some cases, the collision avoidance system 210 may be the same as or similar to the computer system 101 of FIG. 1. For example, present techniques may provide space object operators that may have a potential future collision with the ability to (i) share data to enable operators to base their decision for action off the same data and (ii) coordinate their actions to best improve collision avoidance ability.

The computer system 101 can regulate various aspects of the present disclosure, such as, for example, techniques for collision avoidance between space objects. The computer system 101 can be an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet or extranet, or an intranet or extranet that is in communication with the Internet. The network 130 in some cases is a telecommunication or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries, and saved programs. The storage unit 115 can store user data, e.g., user preferences and user programs. The computer system 101 in some cases can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user (e.g., a space object operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 101 via the network 130.

Methods as disclosed herein can be implemented by way of machine (e.g., computer processor) executable code stored on an electronic storage location of the computer system 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The computer system 101 can include or be in communication with an electronic display 135 that comprises a user interface (UI) 140 for providing, for example, notifications (e.g., CDMs) of one or more potential future collisions, state data of one or more space objects, a communication interface for viewing messages between space object operators. Examples of UI's include, without limitation, a graphical user interface (GUI), a web-based user interface, or an Application Programming Interface (API).

Methods and systems of the present disclosure can be implemented by way of one or more algorithms. An algorithm can be implemented by way of software upon execution by the central processing unit 105. The algorithm can, for example, (a) receive state data corresponding to a plurality of space objects; (b) identify, based at least in part on the state data, a potential future collision between a first space object and a second space object; (c) transmit a notification of the potential future collision to a first operator of the first space object and a second operator of the second space object; (d) establish a communication pathway between the first operator and the second operator; and (e) transmit, via the communication pathway, a message, automatically generated by the first operator, to the second operator.

While preferred embodiments of the present invention have been shown and disclosed herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention disclosed herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Example Machine Learning Techniques

As disclosed herein, in some cases, the systems, the methods, the computer-readable media, and the techniques may implement one or more machine learning. For example, the systems, the methods, the computer-readable media, and the techniques disclosed herein may use one or more machine learning techniques for risk (e.g., collision risk) modeling. In another example, the systems, the methods, the computer-readable media, and the techniques disclosed herein may use one or more machine learning techniques for trajectory prediction. In another example, the systems, the methods, the computer-readable media, and the techniques disclosed herein may use one or more machine learning techniques (e.g., computer vision) for identifying or tracking one or more space objects.

In some cases, machine learning (ML) may generally involve identifying and recognizing patterns in existing data in order to facilitate making predictions for subsequent data. ML may include a ML model (which may include, for example, a ML algorithm). Machine learning, whether analytical or statistical in nature, may provide deductive or abductive inference based at least in part on real or simulated data. The ML model may be a trained model. ML techniques may comprise one or more supervised, semi-supervised, self-supervised, or unsupervised ML techniques. For example, an ML model may be a trained model that is trained through supervised learning (e.g., various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise: k-means, k-means clustering, k-nearest neighbors, learning vector quantization, linear regression, non-linear regression, least squares regression, partial least squares regression, logistic regression, stepwise regression, multivariate adaptive regression splines, ridge regression, principal component regression, least absolute shrinkage and selection operation (LASSO), least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, large language models, vision transformers, or generative adversarial networks.

Training the ML model may include, in some cases, selecting one or more untrained data models to train using a training data set. The selected untrained data models may include any type of untrained ML models for supervised, semi-supervised, self-supervised, or unsupervised machine learning. The selected untrained data models may be specified based upon input (e.g., user input) specifying relevant parameters to use as predicted variables or other variables to use as potential explanatory variables. For example, the selected untrained data models may be specified to generate an output (e.g., a prediction) based upon the input. Conditions for training the ML model from the selected untrained data models may likewise be selected, such as limits on the ML model complexity or limits on the ML model refinement past a certain point. The ML model may be trained (e.g., via a computer system such as a server) using the training data set. In some cases, a first subset of the training data set may be selected to train the ML model. The selected untrained data models may then be trained on the first subset of training data set using appropriate ML techniques, based upon the type of ML model selected and any conditions specified for training the ML model. In some cases, due to the processing power requirements of training the ML model, the selected untrained data models may be trained using additional computing resources (e.g., cloud computing resources). Such training may continue, in some cases, until at least one aspect of the ML model is validated and meets selection criteria to be used as a predictive model.

In some cases, one or more aspects of the ML model may be validated using a second subset of the training data set (e.g., distinct from the first subset of the training data set) to determine accuracy and robustness of the ML model. Such validation may include applying the ML model to the second subset of the training data set to make predictions derived from the second subset of the training data. The ML model may then be evaluated to determine whether performance is sufficient based upon the derived predictions. The sufficiency criteria applied to the ML model may vary depending upon the size of the training data set available for training, the performance of previous iterations of trained models, or user-specified performance requirements. If the ML model does not achieve sufficient performance, additional training may be performed. Additional training may include refinement of the ML model or retraining on a different first subset of the training dataset, after which the new ML model may again be validated and assessed. When the ML model has achieved sufficient performance, in some cases, the ML may be stored for present or future use. The ML model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of ML models may be stored for generating predictions under different sets of input data conditions. In some embodiments, the ML model may be stored in a database (e.g., associated with a server).

As disclosed, the systems, the methods, the computer-readable media, and the techniques disclosed herein may implement one or more computer vision techniques. Computer vision is a field of artificial intelligence that uses computers to interpret and understand the visual world at least in part by processing one or more of images, videos, or even in some cases, audio. In some instances, computer vision may use deep learning models (e.g., convolutional neural networks).

Object detection is a technique used in computer vision for both (1) identification and (2) localization of objects within an image or a video. Image identification aims to predict the class of an image or an object within an image into one of a category or class. Examples of categories or classes may include, e.g., satellite, rocket, meteorite, planet, etc. Image localization is the process of identifying the correct location of one or multiple objects. Bounding boxes may be used in object detection techniques and image localization within computer vision. Bounding boxes may be annotation markers drawn around objects in an image (e.g., a frame of a video). Bounding boxes may be often, although not always, rectangularly shaped. In some cases, bounding boxes may be applied by humans to training data sets. However, bounding boxes may also be applied to images by a trained machine learning that is trained to detect one or more different objects (e.g., humans, hands, faces, cars, etc.). In addition or in alternative to bounding boxes, detection and tracking techniques may use any object detection annotation techniques, such as semantic segmentation, instance segmentation, polygon annotation, non-polygon annotation, landmarking, 3D cuboids, etc.

In some cases, the one or more computer vision techniques may implement a vision transformer (ViT). A ViT may be a transformer-like model that handles vision processing tasks. While convolutional neural networks (CNNs) use convolution, a “local” operation bounded to a small neighborhood of an image, ViTs may use self-attention, a “global” operation, since the VIT may draw information from a large portion of or the whole image. This may allow the ViT to capture distant semantic relevances in an image effectively. Advantageously, ViTs may be well-suited for catching long-term dependencies. In some cases, ViTs may be a competitive alternative to convolutional neural networks (CNNs) as ViTs may outperform the current state-of-the-art CNNs by almost four times in terms of computational efficiency and accuracy. ViTs may be well-suited to object detection, image segmentation, image classification, and action recognition. Moreover, ViTs may be applied in generative modeling and multi-model tasks, including visual grounding, visual-question answering, and visual reasoning. In some cases, ViTs may represent images as sequences, and class labels for the image are predicted, which may enable ViT models to learn image structure independently. Input images may be treated as a sequence of patches where every patch is flattened into a single vector by concatenating the channels of all pixels in a patch and then linearly projecting it to the desired input dimension. For example, a ViT architecture may include the following operations: (A) split an image into patches; (B) flatten the patches; (C) generate lower-dimensional linear embeddings from the flattened patches; (D) add positional embeddings; (E) provide the sequence as an input to a standard transformer encoder; (F) pretrain a model with image labels (e.g., fully supervised on a huge dataset); and (G) finetune on the downstream dataset for image classification. In some cases, there may be multiple blocks in a ViT encoder, with each block comprising three major processing elements: (1) Layer Norm; (2) Multi-head Attention Network; and (3) Multi-Layer Perceptrons. The Layer Norm may keep the training process on track and enable the model to adapt to the variations among the training images. The Multi-head Attention Network may be a network responsible for generating attention maps from the given embedded visual tokens. These attention maps may help the network focus on the most critical regions in the image, such as object(s). The Multi-Layer Perceptrons may be a two-layer classification network with a Gaussian Error Linear Unit at the end. The final Multi-Layer Perceptrons block may be used as an output of the transformer. An application of softmax on this output can provide classification labels (e.g., if the application is image classification).

In some cases, the systems, the methods, the computer-readable media, and the techniques disclosed herein may implement a convolutional neural network (CNN). CNNs may be used for a variety of tasks. For example, CNNs may be used for risk or trajectory modeling. In another example, CNNs may be used in computer vision techniques for identifying and tracking space objects in image data.

Neural networks are a subset of machine learning and are often at the core of many deep learning algorithms. Neural networks may comprise node layers, each which may comprise one or more of an input layer, one or more hidden layers, and an output layer. Each node of a neural network may connect to another node of the neural network. Each node of a neural network may have an associated weight and threshold. In some cases, if an output from any individual node of a neural network is above a specified threshold value, that node is activated, thereby sending data to the next layer of the neural network; otherwise, no data is passed along to the next layer of the neural network.

CNNs are a type of neural network. CNNs are often used for classification and computer vision tasks. Prior to CNNs, manual, time-consuming feature extraction methods were used to identify objects in images. However, CNNs provide a more scalable approach to image classification and object recognition tasks, leveraging principles from linear algebra, specifically matrix multiplication, to identify patterns within an image. That said, CNNs can be computationally demanding, using graphical processing units (GPUs) to train models.

CNNs may be distinguished from other neural networks by their superior performance with image, speech, or audio signal inputs. CNNs may comprise three main types of layers: convolutional layers, pooling layers, and fully-connected (FC) layers. The convolutional layer may be the first layer of a CNN. While convolutional layers can be followed by additional convolutional layers or pooling layers, the fully-connected layer may be the final layer of the CNN.

When applied to computer vision tasks within images, with each layer, the CNN increases in its complexity, identifying greater portions of the image. Earlier layers of a CNN may focus on simple features of an image, such as colors and edges. As the image data progresses through the layers of the CNN, the CNN starts to recognize larger elements or shapes of objects in the image until the CNN identifies the intended object.

The convolutional layer is a core building block of a CNN and may be where much of the computation of the CNN occurs. Convolution layers may use components including input data, a filter, and a feature map. Provided, for example, the input data comprises a color image (which e.g., includes a matrix of pixels in 3D), the input may have three dimensions—a height, width, and depth—which correspond to RGB in an image. CNNs may further comprise a feature detector (also known as a kernel or a filter), which moves across receptive fields of the image, checking if a feature is present. This process may be known as a convolution.

The feature detector may include a filter that is a two-dimensional array of weights, which represents part of an image. Filters of feature detectors may vary in size (e.g., 3×3 matrix), and the size may determine the size of the receptive field. The filter may be applied to an area of the image, and a dot product may be calculated between input pixels and the filter. The dot product may then be fed into an output array. Afterwards, the filter may shift by a stride, repeating the process until the filter has swept across the entire image. The final output from the series of dot products from the input and the filter may be known as a feature map, activation map, or a convolved feature. After each convolution operation, a CNN may apply a Rectified Linear Unit (ReLU) transformation to the feature map, introducing nonlinearity to the CNN.

In some cases, another convolution layer can follow the initial convolution layer of the CNN. For example, the structure of the CNN can become hierarchical as the later layers can see the pixels within the receptive fields of prior layers. As an example, assume a CNN used to determine if an image contains a bicycle. Each individual part of the bicycle (e.g., frame, handlebars, wheels, pedals, etc.) makes up a lower-level pattern in the CNN, and the combination of the parts represents a higher-level pattern, creating a feature hierarchy within the CNN.

The pooling layers, also known as downsampling, are further layers of a CNN. Pooling layers may conduct dimensionality reduction, reducing the number of parameters in the input (e.g., image, video, audio, etc.). Similar to the convolutional layer, the pooling layer sweeps a filter across the entire input, but, unlike the convolution layers, the filters of the pooling layers do not have any weights. Instead, the filters of the pooling layers apply an aggregation function to values within the receptive field, populating the output array. There are two main types of pooling: max pooling and average pooling. Max pooling may comprise moving the filter across the input to select the pixel with the maximum value to send to the output array. Average pooling may comprise moving the filter across the input to calculate the average value within the receptive field to send to the output array. While a lot of information is lost in the pooling layer, the pooling layer also has a number of benefits to the CNN. For example, pooling layers may help to reduce complexity of the CNN, improve efficiency, and limit risk of overfitting of the CNN.

Fully-connected layers are the final layer of a CNN. As previously disclosed, pixel values of an input image are not directly connected to output layers in partially connected layers. However, in the fully-connected layer, each node in the output layer connects directly to a node in the previous layer. The FC layer performs the task of classification based at least in part on the features extracted through the previous layers and their different filters. While convolutional layers and pooling layers tend to use ReLu functions, FC layers may leverage a softmax activation function to classify inputs appropriately, producing a probability from 0 to 1.

Additional Considerations

While preferred embodiments of the present invention have been shown and disclosed herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention disclosed herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

It should be noted that various illustrative or suggested ranges set forth herein are specific to their example embodiments and are not intended to limit the scope or range of disclosed technologies, but, again, merely provide example ranges for frequency, amplitudes, FIG. associated with their respective embodiments or use cases. Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

It should be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based at least in part on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are disclosed herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as disclosed herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, hardware modules may encompass a tangible entity, be that an entity that is physically constructed, permanently configured (e.g., hardwired), or temporarily configured (e.g., programmed) to operate in a certain manner or to perform certain operations disclosed herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information). Elements that are described as being coupled and or connected may refer to two or more elements that may be (e.g., direct physical contact) or may not be (e.g., electrically connected, communicatively coupled, etc.) in direct contact with each other, but yet still cooperate or interact with each other.

The various operations of example methods disclosed herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines disclosed herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It will be understood that, although the terms first, second, FIG. may be used herein to describe various elements, these elements should not be limited by these terms. These terms are only used to distinguish one element from another. For example, a first element may be termed a second element, and, similarly, a second element may be termed a first element, without departing from the scope of the present disclosure.

What is claimed is:

1. A method of collision avoidance between human-made space objects, comprising:

(a) receiving state data corresponding to a plurality of space objects;

(b) identifying, based at least in part on said state data, a potential future collision between a first space object of said plurality of space objects and a second space object of said plurality of space objects;

(c) transmitting (i) a first notification of said potential future collision to a first operator of said first space object, and (ii) a second notification of said potential future collision to a second operator of said second space object;

(d) establishing a communication pathway between said first operator and said second operator;

(e) transmitting via said communication pathway, a message from said first operator to said second operator;

(f) obtaining an indication to collect additional state data corresponding to said first space object;

(g) in response to obtaining said indication in (f), automatically sending a first control signal to a tracking sensor to cause said tracking sensor to (i) orient towards said first space object and (ii) collect said additional state data corresponding to said first space object;

(h) generating a maneuver for said first space object, wherein said maneuver reduces a risk of said potential future collision between said first space object and said second space object; and (i) sending a second control signal to said first space object to execute said maneuver with said first space object.

2. The method of claim 1, further comprising:

tracking said plurality of space objects via one or more computer vision techniques applied to analyze said additional state data to generate telemetry data of said first space object.

3. The method of claim 1, wherein said indication to collect said additional state data corresponding to said first space object is obtained in (f) based at least in part on obtaining a user input from one or both of said first operator or said second operator.

4. The method of claim 1, wherein said tracking sensor comprises one or both of a controllable ground-based telescope or a controllable space telescope.

5. The method of claim 1, further comprising:

generating a plurality of maneuvers for one or both of said first space object or said second space object that avoids said potential future collision based at least in part on said state data and said additional state data, wherein said plurality of maneuvers comprises said maneuver;

transmitting said plurality of maneuvers to one or both of said first operator or said second operator; and obtaining a selection of said maneuver from said plurality of maneuvers by said first operator.

6. The method of claim 1, wherein said first space object and said second space object are each one of: a satellite, a rocket, a high-altitude balloon, a space shuttle, a lander, a rover, an orbiter, a space station, a payload, an aircraft, or a telescope.

7. The method of claim 1, wherein said state data corresponds to one or more of: previous location data for one or more of said plurality of space objects, current location data for one or more of said plurality of space objects, or predicted future location data for one or more of said plurality of space objects.

8. The method of claim 7, wherein said state data comprises first predicted future location data for said first space object and second predicted future location data for said second space object.

9. The method of claim 8, wherein distance data between said first predicted future location data and said second predicted future location data satisfies a threshold and wherein said potential future collision between said first space object and said second space object of said plurality of space objects is identified based at least in part on said distance data.

10. The method of claim 1, wherein said indication to collect said additional state data corresponding to said first space object is obtained in (f) based at least in part on a machine learning model.

11. The method of claim 1, wherein said potential future collision is determined via a machine learning model that comprises a neural network.

12. The method of claim 1, wherein said state data comprises one or more of: flight path data, global navigation satellite system data, acceleration data, rotation data, velocity data, position data, ephemeris data, tracking sensor data, orbital data, or satellite telemetry data.

13. The method of claim 1, wherein said first notification is different than said second notification, and wherein one or both of said first notification or said second notification comprise one or more of: a predicted miss distance, a probability of collision, or a time of collision.

14. The method of claim 1, wherein a conjunction data message is included in one or both of (i) one or both of said first notification or said second notification, or (ii) said state data.

15. The method of claim 1, further comprising:

transmitting a third notification of said potential future collision to a third-party, wherein said third-party is a government entity or another space object operator.

16. The method of claim 1, wherein said message is automatically generated by said first operator.

17. The method of claim 1, wherein said state data comprises (i) flight path data collected by said tracking sensor or (ii) one or more conjunction data messages, or both.

18. The method of claim 17, wherein said flight path data comprises three-dimensional positioning data corresponding to said first space object.

19. A computer system for collision avoidance between human-made space objects, comprising:

one or more processors; and one or more memories storing computer-executable instructions that, when executed, cause the one or more processors to:

(a) receive state data corresponding to a plurality of space objects;

(b) identify based at least in part on said state data, a potential future collision between a first space object of said plurality of space objects and a second space object of said plurality of space objects;

(c) transmit (i) a first notification of said potential future collision to a first operator of said first space object, and (ii) a second notification of said potential future collision to a second operator of said second space object;

(d) establish a communication pathway between said first operator and said second operator;

(e) transmit, via said communication pathway, a message from said first operator to said second operator;

(f) obtain an indication to collect additional state data corresponding to said first space object;

(g) in response to obtaining said indication in (f), automatically send a first control signal to a tracking sensor to cause said tracking sensor to (i) orient towards said first space object and (ii) collect said additional state data corresponding to said first space object;

(h) generate a maneuver for said first space object, wherein said maneuver reduces a risk of said potential future collision between said first space object and said second space object; and (i) send a second control signal to said first space object to execute said maneuver with said first space object.

20. The computer system of claim 19, wherein the system is further configured to:

generate a plurality of maneuvers for one or both of said first space object or said second space object that avoids said potential future collision based at least in part on said state data and said additional state data, wherein said plurality of maneuvers comprises said maneuver;

transmit said plurality of maneuvers to one or both of said first operator or said second operator; and obtain a selection of said maneuver from said plurality of maneuvers by said first operator.

21. One or more non-transitory computer-readable media comprising computer-executable instructions that, when executed by at least one processor, cause the at least one processor to:

(a) receive state data corresponding to a plurality of space objects;

(b) identify based at least in part on said state data, a potential future collision between a first space object of said plurality of space objects and a second space object of said plurality of space objects;

(c) transmit (i) a first notification of said potential future collision to a first operator of said first space object, and (ii) a second notification of said potential future collision to a second operator of said second space object;

(d) establish a communication pathway between said first operator and said second operator;

(e) transmit, via said communication pathway, a message from said first operator to said second operator;

(f) obtain an indication to collect additional state data corresponding to said first space object;

(g) in response to obtaining said indication in (f), automatically send a first control signal to a tracking sensor to cause said tracking sensor to (i) orient towards said first space object and (ii) collect said additional state data corresponding to said first space object;

(h) generate a maneuver for said first space object, wherein said maneuver reduces a risk of said potential future collision between said first space object and said second space object; and (i) send a second control signal to said first space object to execute said maneuver with said first space object.

* * * * *